(12) United States Patent
Akinaga

(10) Patent No.: US 11,971,977 B2
(45) Date of Patent: Apr. 30, 2024

(54) SERVICE PROVIDING APPARATUS

(71) Applicant: NTT DOCOMO, INC., Tokyo (JP)

(72) Inventor: Yoshikazu Akinaga, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 687 days.

(21) Appl. No.: 17/252,082

(22) PCT Filed: Jun. 17, 2019

(86) PCT No.: PCT/JP2019/023915
§ 371 (c)(1),
(2) Date: Dec. 14, 2020

(87) PCT Pub. No.: WO2019/244839
PCT Pub. Date: Dec. 26, 2019

(65) Prior Publication Data
US 2021/0264015 A1  Aug. 26, 2021

(30) Foreign Application Priority Data

Jun. 18, 2018  (JP) .................................. 2018-115493

(51) Int. Cl.
*G06F 21/44* (2013.01)
*H04L 9/40* (2022.01)
*H04L 67/12* (2022.01)

(52) U.S. Cl.
CPC .............. *G06F 21/44* (2013.01); *H04L 63/10* (2013.01); *H04L 67/12* (2013.01)

(58) Field of Classification Search
CPC ........ G06F 21/44; G06F 21/31; G06F 21/335; H04L 67/12; H04L 63/08; H04L 63/0807; H04L 63/0876; H04L 63/10; H04L 63/102
See application file for complete search history.

(56) References Cited

U.S. PATENT DOCUMENTS

2015/0128231 A1* 5/2015 Nakajima ........... H04L 63/0876
726/5
2019/0104128 A1* 4/2019 Carol .................. H04L 63/0428
(Continued)

FOREIGN PATENT DOCUMENTS

JP  2017157221 A  9/2017

OTHER PUBLICATIONS

International Search Report issued in International Application No. PCT/JP2019/023915, dated Sep. 3, 2019 (5 pages).
(Continued)

*Primary Examiner* — Shaqueal D Wade-Wright
(74) *Attorney, Agent, or Firm* — Osha Bergman Watanabe & Burton LLP

(57) ABSTRACT

A service providing apparatus includes a first management unit that manages items of device identification information for identifying devices used by users and items of character identification information for identifying characters of the devices, in such a manner that the items of device identification information are associated with the items of character identification information; a second management unit that manages, for each of the users, one or more items of service identification information for identifying services corresponding to an item of character identification information; and a service providing unit that provides, using an item of service identification information, a service in accordance with a character of a device to a user who uses the device.

1 Claim, 18 Drawing Sheets

(56) References Cited

U.S. PATENT DOCUMENTS

2019/0104192 A1* 4/2019 Lonij ..................... G06Q 50/01
2019/0236205 A1* 8/2019 Jia ....................... G06F 16/3329
2022/0256220 A1* 8/2022 Miyahara ............. H04N 21/266

OTHER PUBLICATIONS

Written Opinion issued in International Application No. PCT/JP2019/023915; dated Sep. 3, 2019 (3 pages).

* cited by examiner

FIG.3B

| USER ID | DEVICE ID | CHARACTER ID | SERVICE ID | DEVICE TOKEN |
|---|---|---|---|---|
| UID000A | DID10001 | CID000A | SID00011 | Token10001 |
| | DID10002 | CID000A | SID00012 | Token10002 |
| | DID20001 | CID000B | ... | Token20001 |
| | DID10003 | CID000A | SID00021 | Token10003 |
| UID000B | DID20002 | CID000B | SID00022 | Token20002 |
| | DID20003 | CID000B | ... | Token20003 |
| ... | | | | ... |

| CHARACTER ID | MAIN AGENT | SERVICE ID | EXPERT AGENT |
|---|---|---|---|
| CID000A | MainBotA | SID00011 | DDBa, DDBb, ... |
|  |  | SID00021 | DDBm, DDBn, ... |
|  |  | ... | ... |
| CID000B | MainBotB | SID00012 | DDBi, DDBj, ... |
|  |  | SID00022 | DDBx, DDBy, ... |
| ... | ... | ... | ... |

| INDIVIDUAL IDENTIFICATION INFORMATION | APPLICATION ID | CHARACTER ID | DEVICE ID |
|---|---|---|---|
| xxxxx00001 | AID0001 | CID000A | DID30001 |
| xxxxx00001 | AID0002 | CID000B | DID30002 |
| xxxxx00002 | AID0001 | CID000A | DID30003 |
| ... | ... | ... | ... |

| USER ID | DEVICE ID | CHARACTER ID | SERVICE ID | DEVICE TOKEN |
|---|---|---|---|---|
| UID000A | DID10001 | CID000A | SID00011 | Token10001 |
| | DID10002 | CID000A | | Token10002 |
| | DID30001 | CID000A | | Token10004 |
| | DID30003 | CID000A | | Token10005 |
| | ... | ... | | ... |
| | DID20001 | CID000B | SID00012 | Token20001 |
| | DID30002 | CID000B | | Token20004 |
| | ... | ... | ... | ... |
| UID000B | DID10003 | CID000A | SID00021 | Token10003 |
| | DID20002 | CID000B | SID00022 | Token20002 |
| | DID20003 | CID000B | | Token20003 |
| | ... | ... | ... | ... |
| ... | | | | |

302

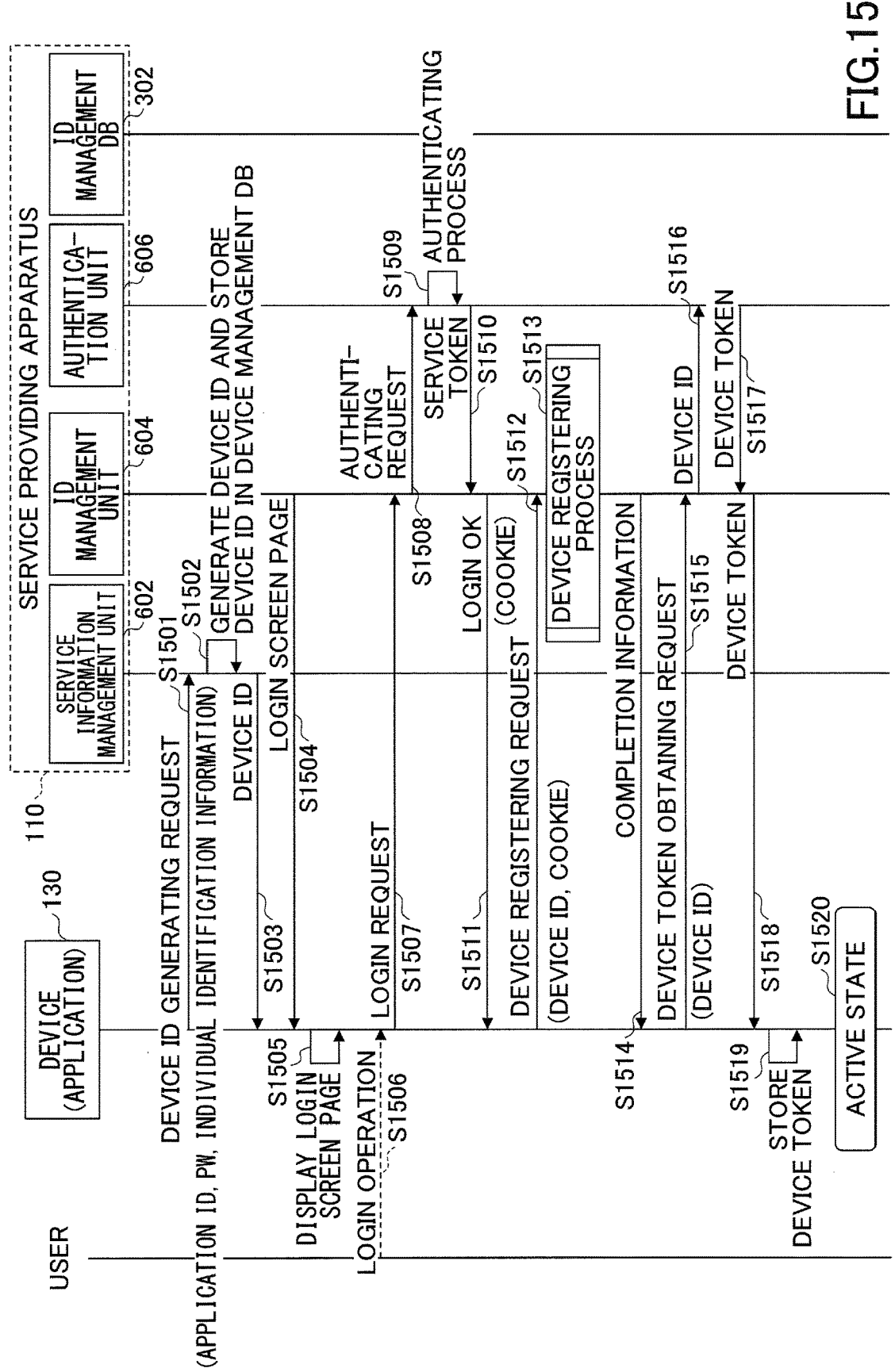

SERVICE PROVIDING APPARATUS

TECHNICAL FIELD

The present invention relates to a service providing apparatus.

BACKGROUND ART

A service providing system that receives registration of a device used by a user and provides a service associated with the device to the user using the registered device is known.

For example, a contents providing system that associates a user with a plurality of devices and provides contents to a user who uses a device without storing information enabling to identify the user is known (see, for example, Patent Document 1).

PRIOR ART DOCUMENT

Patent Document

Japanese Laid-Open Patent Application No. 2017-157221

SUMMARY OF THE INVENTION

Problem to be Solved by the Invention

There is a request to provide the same services to a plurality of devices having the same characters from among devices used by a user and provide different services to devices having different characters from among the devices used by the user.

For example, for a case where a user puts smart devices such as a smart speaker, a smart robot, and so forth at a shop, a delivery vehicle, living at home, and so forth, it is desirable to be able to, in response to speaking to any smart device, receive an interaction service from the same character. In addition, for a case where the same user speaks to a smart cooking appliance in a home kitchen, it is desirable to be able to receive an interaction service from another character who is familiar with a recipe, a cooking method, or the like.

However, in the prior art, it is difficult to provide the same services to a plurality of devices having the same characters used by a user and provide different services to devices having different characters used by the user.

Embodiments of the present invention have been devised in view of the problem and, according to the embodiments, it is easy to provide the same services to a plurality of devices having the same characters used by a user and provide different services to devices having different characters used by the user.

Means for Solving the Problem

In order to solve the problem, a service providing apparatus according to the embodiments of the present invention includes a first management unit configured to manage items of device identification information for identifying devices used by users and items of character identification information for identifying characters of the devices, in such a manner that the items of device identification information are associated with the items of character identification information; a second management unit configured to manage, for each of the users, one or more items of service identification information that identify services corresponding to an item of character identification information; and a service providing unit configured to provide, using an item of service identification information, a service in accordance with a character of a device to a user who uses the device.

Advantageous Effects of the Invention

According to the embodiments of the present invention, it is easy to provide the same services to a plurality of devices having the same characters used by a user and provide different services to devices having different characters used by the user.

BRIEF DESCRIPTION OF THE DRAWINGS

FIG. 3B illustrates an example (2) of information managed by the service providing apparatus according to the embodiments;

FIG. 3C illustrates an example (3) of information managed by the service providing apparatus according to the embodiments;

FIG. 14A illustrates an example (1) of information managed by a service providing apparatus according to the second embodiment;

FIG. 14B illustrates an example (2) of information managed by the service providing apparatus according to the second embodiment; and FIG. 15 is a sequence diagram illustrating an example of a device activating process according to the second embodiment.

MODES FOR CARRYING OUT THE INVENTION

Hereinafter, the embodiments of the present invention will be described with reference to the drawings. The embodiments described below are examples, and embodiments to which the present invention is applied are not limited to the following embodiments.

System Configuration

Figure 1:
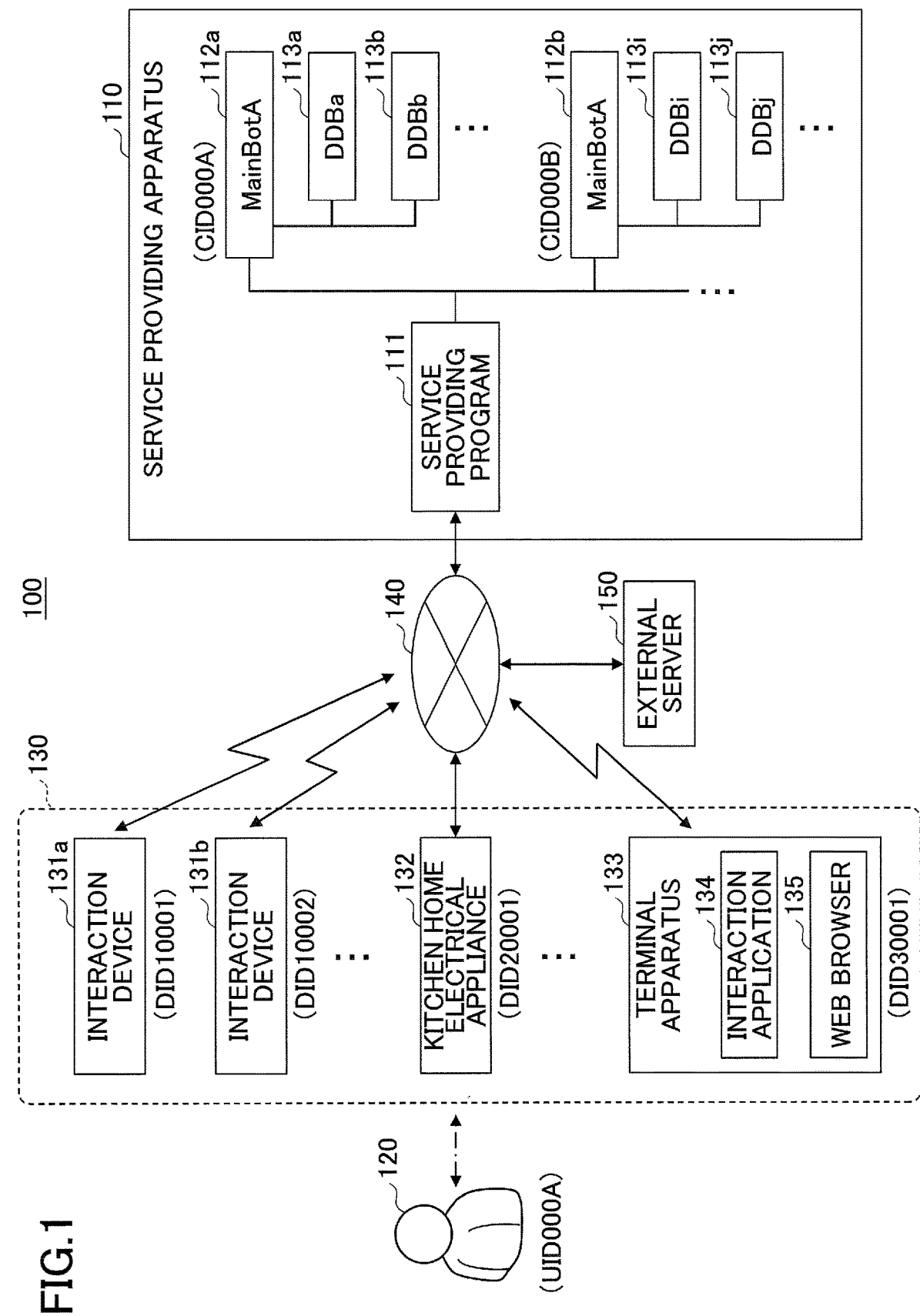
FIG. 1 illustrates an example of a system configuration of a service providing system according to the embodiments.

FIG. 1 illustrates an example of a system configuration of a service providing system according to the embodiments. The service providing system 100 includes one or more devices 130 used by a user 120 and a service providing apparatus 110 that provides services to the user 120 using a device 130 via a communication network 140.

The devices 130 include various devices that communicate with the service providing apparatus 110 via the communication network 140 and interact with the user 120 by voice (or text, or the like). For example, the devices 130 may include interaction devices 131a, 131b, . . . such as a smart speaker, a smart robot, and so forth interacting with the user 120, and/or a kitchen home electrical appliance 132 and so forth such as a refrigerator, a microwave oven, and so forth provided with interaction functions. However, these are merely examples, and the devices 130 may include a variety of devices such as an interactive vacuum cleaner, television, and automobile.

Preferably, the devices 130 include a terminal apparatus 133, such as a smartphone or a tablet terminal, that executes a predetermined application program (hereinafter referred to as an "application") that implements an interaction function. In this case, even though the same terminal apparatus 133 is used, the service providing system 100 manages the terminal apparatus 133 executing a different application (such as a kitchen application) from the interaction application 134 as another device.

The devices 130 have characters corresponding to the respective devices 130, and in the example of FIG. 1, the interaction devices 131a and 131b as well as the terminal apparatus 133 executing the interaction application 134 have the same characters. The kitchen home electrical appliance 132 has a character different from the characters of the interaction devices 131a and 131b and the terminal apparatus 133 that executes the interaction application 134.

The service providing apparatus 110 is an information processing apparatus having a computer configuration or a system including a plurality of information processing apparatuses. The service providing apparatus 110 communicates with a device 130 used by the user 120 by executing a service providing program 111 and provides a voice or text natural interaction service to the user 120 through the device 130. Hereinafter, as an example, it will be assumed that a voice interaction service is provided by the service providing apparatus 110.

The service providing apparatus 110 provides a first natural interaction service corresponding to a character of a device 130 to the user 120 using the device 130 by executing an interaction program corresponding to the character of the device 130.

In the following description, a first natural interaction service corresponding to a character of a device 130 will be referred to as a "main agent". Second natural interaction services, i.e., dedicated interaction services specialized for various services called by the main agent, will be referred to as "expert agents".

The user 120 can access the service providing apparatus 110 and register one or more expert agents in association with a main agent using, for example, a web browser or the like of the terminal apparatus 133.

In the example of FIG. 1, a DDBa 113a and a DDBb 113b are registered to implement expert agents in association with an interaction program MainBotA 112a implementing a first main agent corresponding to the character of the interaction devices 131a, 131b and so forth. Thus, the service providing apparatus 110 provides the user 120 with interaction services using the first main agent implemented by the MainBotA 112a and the expert agents implemented by the DDBa 113a and the DDBb 113b.

Similarly, in the example of FIG. 1, a DDBi 113i and a DDBj 113J, which implement expert agents, are registered in association with an interaction program MainBotB implementing a second main agent corresponding to the character of the kitchen home electrical appliance 132 and so forth. Thus, the service providing apparatus 110 provides the user 120 with interaction services using the second main agent implemented by the MainBotB and the expert agents implemented by the DDBi 113i and the DDBj 113J.

A "DDB", an interaction program that implements an expert agent, is an abbreviation of a Developer Defined Bot. For example, a DDB is provided by a service provider that provides various services. A DDB may be executed by an information processing apparatus (for example, an external server 150) outside of the service providing apparatus 110.

The interaction programs implementing the main agents and the expert agents may, for example, apply techniques such as chat bots that automatically respond to natural-language inquiries from the user 120. A chat bot is implemented, for example, by "purpose interpretation" that determines what the user 120 wants to do from voice or text input by the user 120 and "interaction control" that generates response contents in accordance with the thus interpreted purpose. Upon generating response contents in interaction control, the chat bot may obtain various information from the external server 150 to generate the response contents.

Figure 2:
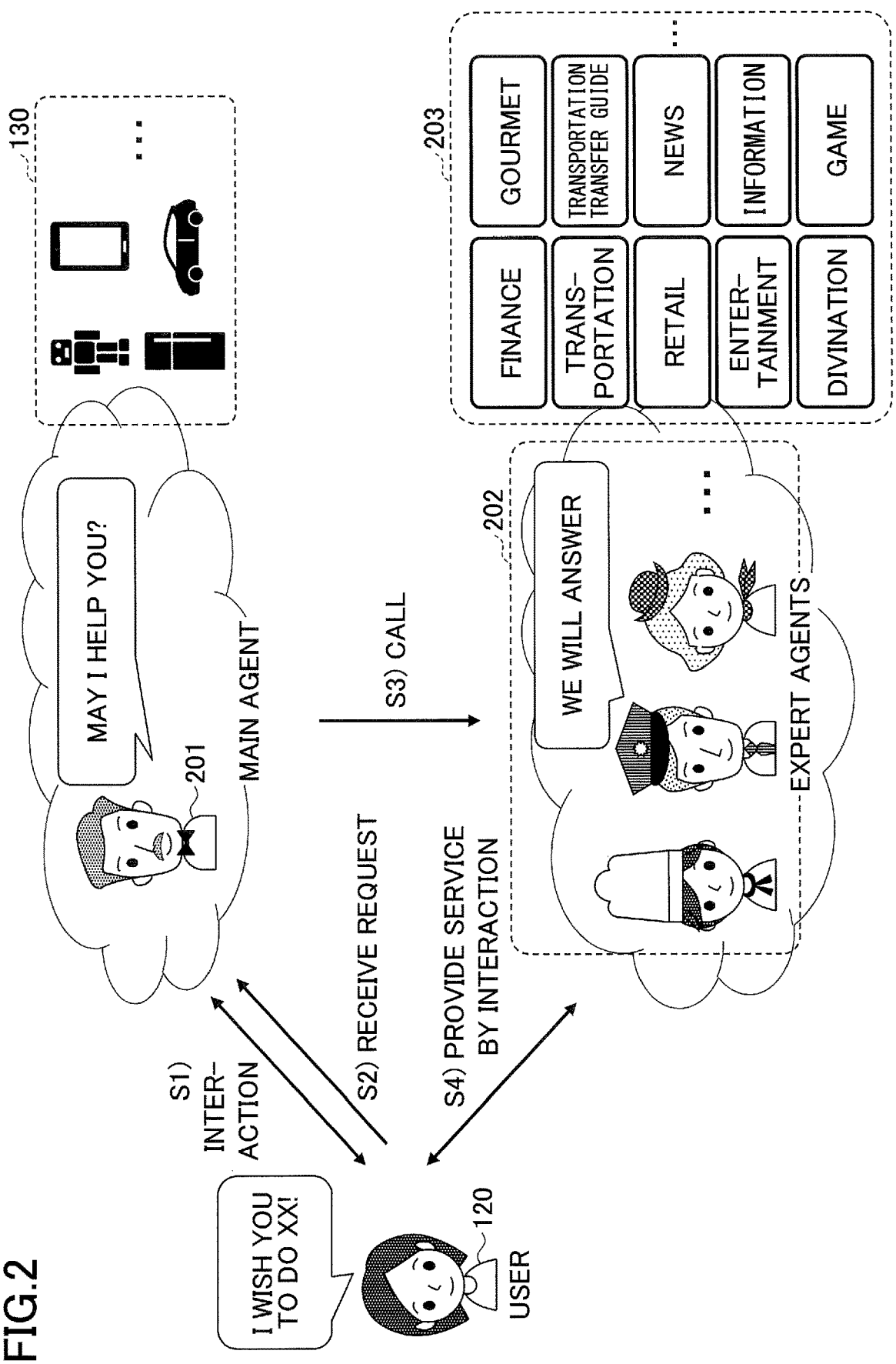
FIG. 2 illustrates an image of services provided by the service providing system according to the embodiments.

FIG. 2 illustrates an image of services provided by the service providing system according to the embodiments. As illustrated in FIG. 2, a device 130 used by the user 120 performs a voice interaction with the user 120 using the main agent 201, which is an interaction service corresponding to the character of the device 130 (step S1). In addition, the main agent 201 receives a request by voice from the user 120 and, during interaction, responds to a relatively simple request such as a request "what time is it now?" or "how is the weather today?"

The program implementing the main agent 201 is provided, for example, by a manufacturer or the like that has developed a device 130. However, it is difficult for the manufacturer who has developed a device 130 to develop and provide interaction services corresponding to various services such as, for example, finance, transportation, retail, and so forth.

Therefore, in the service providing system 100 according to the embodiments, for example, the expert agents 202 that are interaction services corresponding to various services 203 such as finance, transportation, retail, and so forth can be registered in advance by the user 120 in association with the main agent 201.

As a result, the main agent 201 calls an expert agent 202 that corresponds to finance, for example, upon receipt of a professional request regarding finance from the user 120 (step S3). The called expert agent 202 provides, for example, a service concerning a financial matter to the user 120 by voice interaction (step S4).

In the service providing system 100 according to the embodiments, because the user 120 can register any expert agent in association with the main agent 201, the same devices 130 provide different services for respective users. Therefore, as illustrated in FIGS. 3A-3C, the service providing system 100 manages IDs (identification information) that identify users 120, devices 130, characters corresponding to the devices 130, main agents 201, expert agents 202, and so forth.

Figure 3A:
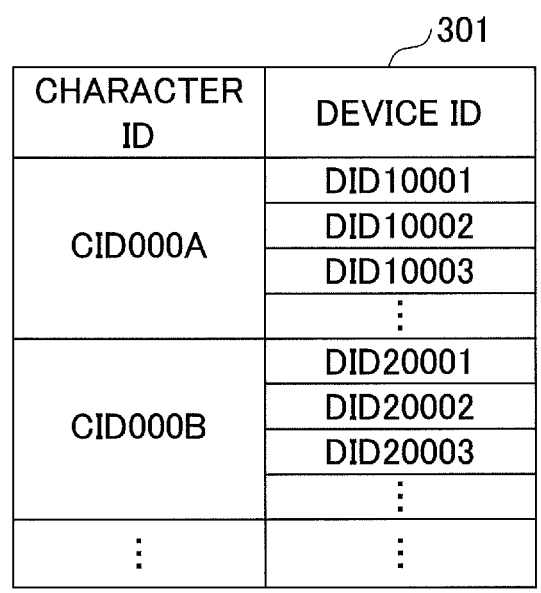
FIG. 3A illustrates an example (1) of information managed by a service providing apparatus according to the embodiments.

FIG. 3A illustrates an example of a device management DB (Database) 301 managed by the service providing apparatus 110. In the device management DB 301, device IDs (device identification information) identifying the devices 130 used by the user 120 and character IDs (character identification information) identifying characters corresponding to the devices 130 are stored in such a manner that the device IDs are association with the character IDs.

For example, the manufacturer of the interaction devices 131a and 131b having the character corresponding to the character ID "CID000A" registers the device IDs assigned to the interaction devices 131a and 131b in the device management DB 301 in association with the character IDs. The device management DB 301 allows the service providing apparatus 110 to obtain a character ID corresponding to each device 130. However, an embodiment is not limited thereto. The service providing apparatus 110 may register combinations of the device IDs and the character IDs transmitted from the devices 130 in the device management DB 301, for example.

FIG. 3B illustrates an example of an image of an ID management DB 302 managed by the service providing apparatus 110. The service providing apparatus 110 manages service IDs corresponding to character IDs for each user using the ID management DB 302.

For example, in FIG. 1, the user 120 of a user ID "UID000A" registers the interaction device 131a of a device ID "DID10001" in the service providing apparatus 110. As a result, the service providing apparatus 110 authenticates the user 120 (for example, using OpenID Authentication or the like) and, in response to successful authentication, obtains a character ID "CID000A" corresponding to the device ID "DID10001" from the device management DB 301. The service providing apparatus 110 determines whether the service ID corresponding to the obtained character ID "CID000A" is registered in the ID management DB 302.

For a case where the service ID corresponding to the obtained character ID "CID000A" has been already registered in the ID management DB 302, the service providing apparatus 110 registers the device ID "DID10001" in the ID management DB 302 in association with the registered service ID.

For a case where the service ID corresponding to the obtained character ID "CID000A" has not been registered in the ID management DB 302, the service providing apparatus 110 generates a service ID corresponding to the character ID "CID000A". The service providing apparatus 110 registers the device ID "DID10001" in the ID management DB 302 in association with the generated service ID.

Thus, for example, as illustrated in FIG. 3B, the service providing apparatus 110 can manage one or more service IDs (service identification information) that 10 identify services corresponding to a character ID for each user (for each user ID).

Preferably, the service providing apparatus 110 generates a device token that is authentication information for using a service ID for a device 130 registered in the ID management DB 302 and registers the information of the generated device token in the ID management DB 302. However, it is also possible that the service providing apparatus 110 may manage a device token in association with a device ID separately from the ID management DB 302.

FIG. 3C illustrates an example of a service management DB 303 managed by the service providing apparatus 110. Information of a main agent corresponding to each character ID is pre-registered in the service management DB 303.

Upon generating a service ID corresponding to a character ID, the service providing apparatus 110 registers the generated service ID in the service management DB 303 in association with the character ID, for example, as illustrated in FIG. 3C. In addition, the service providing apparatus 110 registers information of an expert agent registered by the user 120 in association with a main agent in the service management DB 303 in association with a service ID, for example, as illustrated in FIG. 3C.

Using the ID management DB 302 and the service management DB 303 described above, the service providing apparatus 110 can identify a user 120, a main agent, and an expert agent corresponding to a service ID. Thus, the service providing apparatus 110 can provide a device 130 having a device token with an interaction service in accordance with a character of the device 130 and a user, using a service ID corresponding to the device token.

For example, the service providing apparatus 110 provides an interaction service to the interaction device 131a having a device token "Token10001", using a main agent and an expert agent corresponding to a service ID "SID00011". Similarly, the service providing apparatus 110 provides an interaction service to the interaction device 131b having a device token "Token10002", using the main agent and the expert agent corresponding to the service ID "SID00011".

The service providing apparatus 110 provides an interaction service to the kitchen home electrical appliance 132 having a device token "Token20001" using a main agent and an expert agent corresponding to a service ID "SID0002".

Thus, in the service providing system 100 according to the embodiments, it is easy to provide the same services to a plurality of devices 130 having the same characters used by a user 120 and to provide different services to devices 130 having different characters used by the user 120. For example, what the user 120 is to do for receiving the same interaction services from a plurality of devices 130 having the same characters is only to register the devices 130 in the service providing system 100 using the user ID and the device IDs.

In addition, because service IDs are managed for each user, the user 120 can customize interaction services to be provided on a user basis by registering one or more expert agents in association with a main agent.

Hardware Configuration

Next, a hardware configuration of the service providing apparatus 110 and the devices 130 will be described.

Hardware Configuration of Service Providing Apparatus

Figure 4:
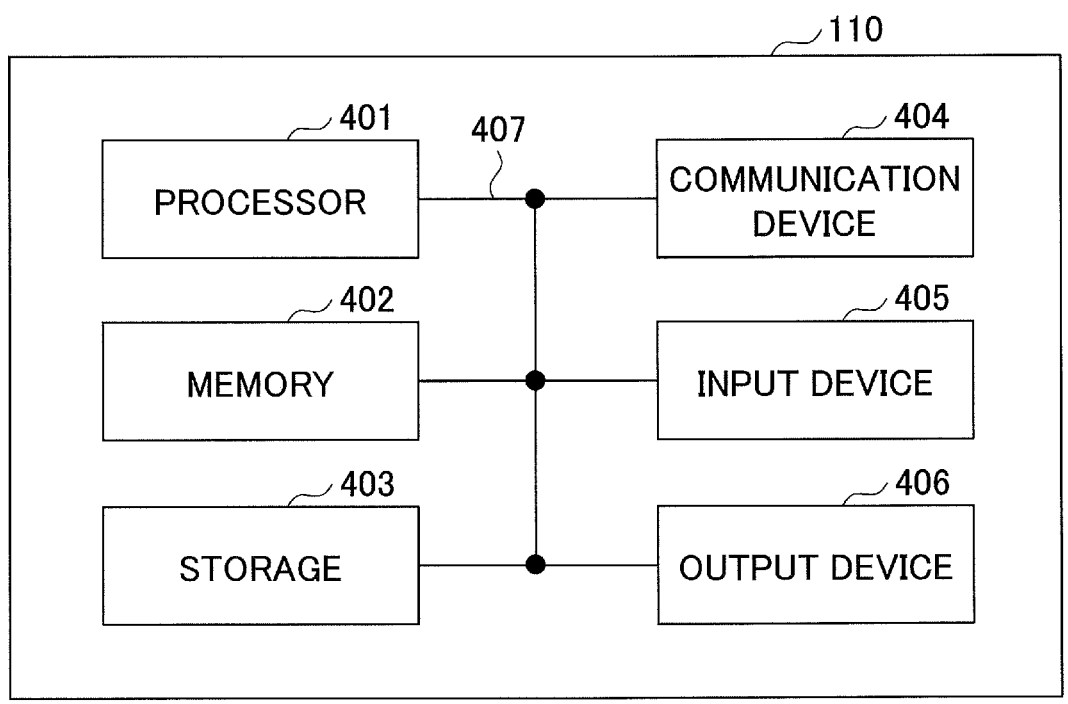
FIG. 4 illustrates an example of a hardware configuration of the service providing apparatus according to the embodiment.

FIG. 4 illustrates a hardware configuration of a service providing apparatus according to the embodiments. The service providing apparatus 110 may be physically configured as a computer apparatus including a processor 401, a memory 402, a storage 403, a communication device 404, an input device 405, an output device 406, a bus 407, and so forth. In the following description, the term "apparatus" can be read as a circuit, a device, a unit, or the like.

The processor 401 operates, for example, an operating system to control the entire computer. The processor 401 may include a central processing unit (CPU) including an interface for a peripheral device, a control unit, an arithmetic unit, a register, and so forth.

The processor 401 reads programs (program codes), software modules, and data from the storage 403 and/or the communication device 404 to the memory 402 and performs various processes accordingly. As the programs, programs that cause a computer to execute at least some of operations of the service providing apparatus 110 are used.

The various processes performed by the service providing apparatus 110 may be executed by one processor 401 or may be executed simultaneously or sequentially by two or more processors 401. The processor 401 may be implemented by one or more chips. The programs may be transmitted from a network via a telecommunication line.

The memory 402 is a computer-readable recording medium and may include, at least one of, for example, a ROM (Read-Only Memory), an EPROM (Erasable Programmable ROM), an EEPROM (Electrically Erasable Programmable ROM), a RAM (Random Access Memory), and so forth. The memory 402 may be referred to as a register, a cache, a main memory, or the like. The memory 402 may store programs (program codes), software modules, and so forth, executable to implement service providing methods according to the embodiments of the present invention.

The storage 403 is a computer-readable recording medium and may include at least one of an optical disc, such as a CD-ROM (Compact Disc ROM), a hard disk drive, a flexible disk, a magneto-optical disc (for example, a compact disk, a digital versatile disk, or a Blu-ray (registered trademark) disk), a smart card, a flash memory (for example, a card, a stick, or a key drive), a floppy (registered trademark) disk, a magnetic strip, and so forth. The storage 403 may be referred to as an auxiliary storage device. The storage medium described above may be, for example, a database, a server, or another suitable medium including the memory 402 and/or the storage 403.

The communication device 404 is hardware (a transmission and reception device) for communicating between computers via a wired and/or wireless network, and is also referred to as a network device, a network controller, a network card, a communication module, or the like.

The input device 405 is, for example, a keyboard, a mouse, a microphone, a switch, a button, a sensor, or the like that receives an external input. The output device 406 is, for example, a display, a speaker, a LED lamp, or the like that performs outputting. The input device 405 and the output device 406 may have an integral configuration (for example, a touch panel).

Each device, such as the processor 401 or the memory 402, is connected by the bus 407 for communicating information. The bus 407 may include a single bus or may include different buses between devices.

Hardware Configuration of Device

Figure 5:
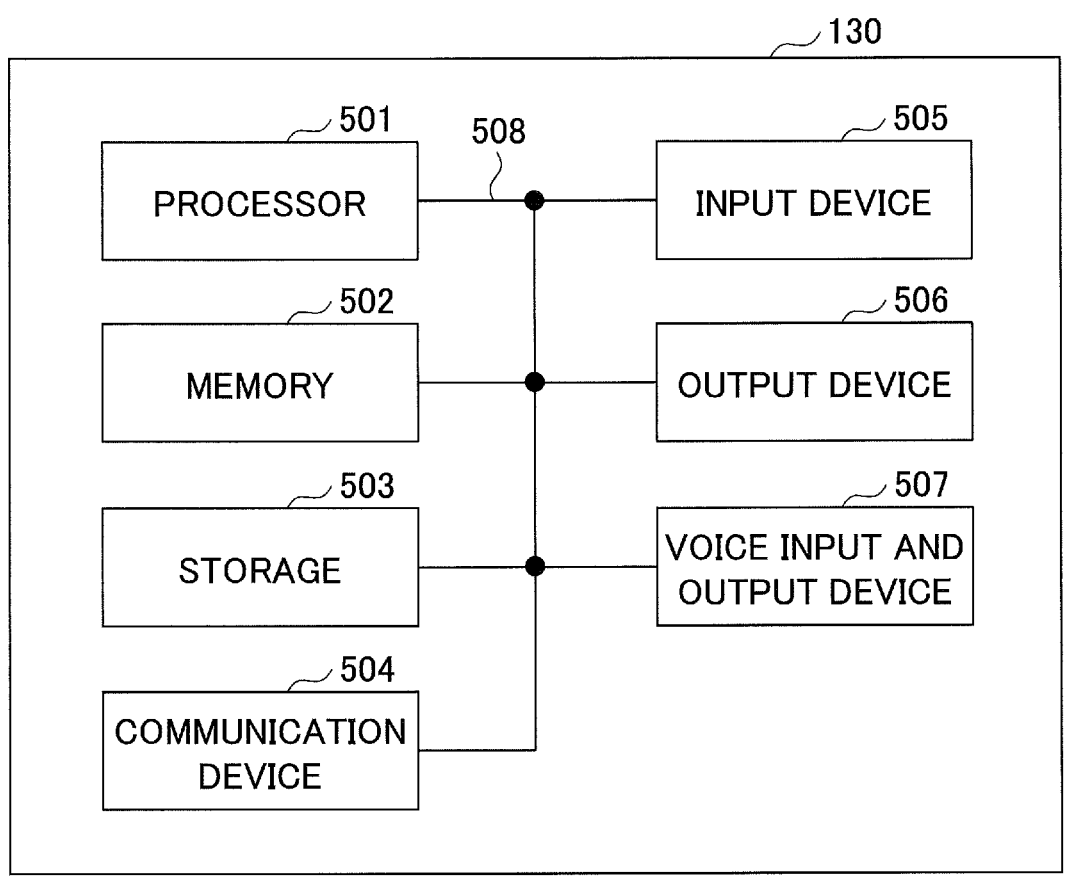
FIG. 5 illustrates an example of a hardware configuration of a device according to the embodiments.

FIG. 5 illustrates a hardware configuration of a device according to the embodiments. A device 130 may be physically configured as a computer apparatus including a processor 501, a memory 502, a storage 503, a communication device 504, an input device 505, an output device 506, a voice input and output device 507, a bus 509, and so forth. Because the processor 501, the memory 502, the storage 503, the communication device 504, the input device 505, the output device 506, and the bus 509 are similar to the processor 401, the memory 402, the storage device 403, the communication device 404, the input device 405, the output device 406, and the bus 407 described above, the description will not be repeated.

The voice input and output device 507 includes, for example, an amplifier circuit amplifying an audio signal, a microphone obtaining a voice and converting the voice into an audio signal, a speaker converting an audio signal into a voice and outputting the voice, an interface outputting an audio signal, and so forth.

First Embodiment

Functional Configuration

Next, a functional configuration of a service providing apparatus 110 according to a first embodiment will be described. Concerning the first embodiment, an example will be described where a device 130 used by the user 120 is an electronic device such as, for example, an interaction device 131a or 131b, or a kitchen home electrical appliance 132, or the like, illustrated in FIG. 1.

Functional Configuration of Service Providing Apparatus

Figure 6:
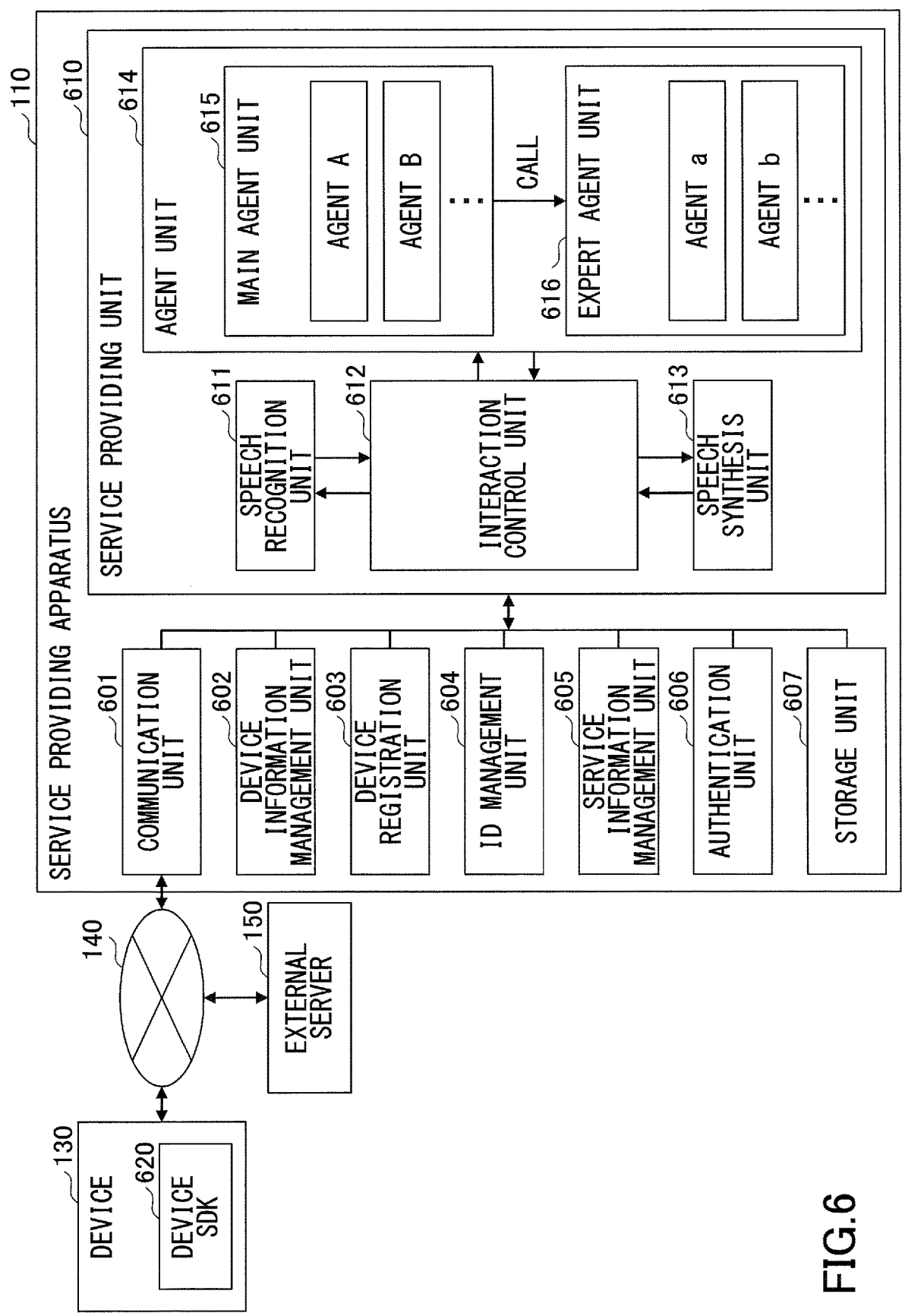
FIG. 6 illustrates an example of a functional configuration of a service providing apparatus according to a first embodiment.

FIG. 6 illustrates an example of a functional configuration of the service providing apparatus according to the first embodiment. The service providing apparatus 110 includes, for example, a communication unit 601, a device information management unit 602, a device registration unit 603, an ID management unit 604, a service information management unit 605, an authentication unit 606, a storage unit 607, and a service providing unit 610.

The service providing apparatus 110 implements the above-described functional configurations by executing programs such as the service providing program 111, the MainBotA 112a, the MainBotB 112b, the DDBa 113a, the DDBb 113b, the DDBi 113i, and the DDBj 113j by the processor 401 of FIG. 4. At least some of the above-described functional configurations may be implemented by hardware.

The communication unit 601 connects the service providing apparatus 110 to the communication network 140 using the communication device 404 of FIG. 4 and communicates with a device 130 used by the user; the external server 150; or the like, for example.

The device information management unit (a first management unit) 602 manages device IDs identifying devices 130 used by users 120 in association with character IDs identifying characters of the devices 130. For example, the device information management unit 602 stores and manages the device management DB 301 illustrated in FIG. 3A in the storage unit 607.

For example, the device information management unit 602 provides an interface (for example, a web page) for a manufacturer or the like that manufactures a device 130 to register a character ID and a device ID of the device 130. The device information management unit 602 registers, in the device management DB 301 stored in the storage unit 607, a character ID and a device ID of a device 130 registered by a manufacturer or the like manufacturing the device 130 in such a manner that the character ID is associated with the device ID.

The device registration unit 603 provides an interface (for example, a web page, etc.) for registering a device 130 used by a user 120 in the service providing apparatus 110 (or the service providing system 100). For example, the device registration unit 603 receives a device registering request for a device 130 by a user 120 from a web page or the like for registering the device 130.

The ID management unit (a second management unit) 604 manages one or more service IDs that identify services corresponding to a character ID for each user 120 (on a user basis). For example, the ID management unit 604 stores and manages the ID management DB 302 illustrated in FIG. 3B in the storage unit 607.

For example, the ID management unit 604 obtains, from the device management DB 301, a character ID corresponding to a device ID included in a device registering request for a device 130 received by the device registration unit 603. The ID management unit 604 determines whether a user ID of a user 120 using the device 130 and a service ID corresponding to the obtained character ID are registered in the ID management DB 302.

For a case where a user ID of a user 120 and a service ID corresponding to the obtained character ID are not registered in the ID management DB 302, the ID management unit 604 generates a user ID of a user 120 and a service ID corresponding to the obtained character ID.

The ID management unit 604 registers, in the ID management unit 604, information such as a user ID of a user 120 using a device 130, a device ID of the device 130, a device token provided for the device 130 by the device registration unit 603, and so forth, in association with a service ID.

The service information management unit 605 manages a service corresponding to a service ID (for example, a main agent and an expert agent) using the service management DB 303, for example, illustrated in FIG. 3C.

For example, the service information management unit 605 previously stores information of a main agent corresponding to each character ID. The service information management unit 605 registers a service ID generated by the ID management unit 604 in the service management DB 303 in association with a character ID, for example, as illustrated in FIG. 3C.

The service information management unit 605 provides, for example, a web page for registering an expert agent and receives registration of an expert agent from a user 120.

For example, a user 120 registers expert agents "DDBa" and "DDBb" corresponding to a main agent "MainBotA" from a web page provided by the service information management unit 605. At this time, the service information management unit 605 registers the information of the expert agents "DDBa" and "DDBb" in the service management DB 303 in association with the main agent "MainBotA" (or a character ID "CID000A"), for example, as illustrated in FIG. 3C.

The service information management unit 605 may manage information of a main agent and information of an expert agent using identification information such as bot IDs.

The authentication unit 606 authenticates a user 120 requesting registration of a device 130 and authenticates a device token. For example, the authentication unit 606 authenticates a user 120 requesting registration of a device 130 using the external server 150 or the like.

The authentication unit 606 generates, for a device 130 for which authentication is successful, a device token that is authentication information for using a service ID corresponding to a character ID of the device 130 from among one or more service IDs corresponding to a user. The authentication unit 606 authenticates a device token included in request information requesting a service transmitted from a device 130 or the like.

The storage unit 607 is implemented, for example, by a program executed by the processor 401 of FIG. 4 and the memory 402 and so forth, and stores various information such as the device management DB 301, the ID management DB 302, and the service management DB 303 described above.

The service providing unit 610 uses a service ID to provide a user 120 using a device 130 with an interaction service in accordance with a character of the device 130. The service providing unit 610 includes, for example, a speech recognition unit 611, an interaction control unit 612, a speech synthesis unit 613, and an agent unit 614, and is also called a natural interaction platform.

The speech recognition unit 611 recognizes a speech of a user 120 included in voice data and converts the speech into text data or the like under the control of the interaction control unit 612.

The interaction control unit 612 controls natural interaction with a user 120 using the speech recognition unit 611, the speech synthesis unit 613, and the agent unit 614. For example, the interaction control unit 612 identifies a main agent corresponding to a service ID on the basis of the service ID or a device token included in request data received from a device 130.

The interaction control unit 612 converts voice data of the user 120 included in the request data into text data or the like using the speech recognition unit 611 and provides the identified main agent with the converted text data and the service ID.

As another example, the interaction control unit 612 may interpret a purpose of the user 120 from the text data output from the speech recognition unit 611 and provides the identified main agent with the interpreted purpose and the service ID.

The interaction control unit 612 then converts response data (text data, or the like) output from a main agent unit 615 or an expert agent unit 616 to voice data using the speech synthesis unit 613 and transmits the converted voice data to the requesting device 130.

The speech synthesis unit 613 generates speech data corresponding to the response data under the control of the interaction control unit 612.

The agent unit 614 is implemented, for example, by executing the MainBotA 112a, MainBotB 112b, DDBa 113a, DDBb 113b, . . . , and so forth of FIG. 1 by the processor 401 of FIG. 3. The agent unit 614 includes the main agent unit 615 and the expert agent unit 616.

The main agent unit 615 includes a plurality of main agents 201, such as an agent A, an agent B, and so forth implemented by, for example, the MainBotA 112a, the MainBotB 112b, and so forth. The expert agent unit 616 includes a plurality of expert agents 202, such as agents a and b, and so forth, implemented by, for example, the DDBa 113a, the DDBb 113b, and so forth.

Each of the main agents 201 included in the main agent unit 615 interprets a purpose of a user 120 from text data in response to the text data being sent from the interaction control unit 612.

A main agent 201 generates response contents in accordance with an interpreted purpose (or a purpose sent from the interaction control unit 612) and provides the interaction control unit 612 with response data (text data or the like) indicating the generated response contents. A main agent 201 calls an expert agent 202 corresponding to a service ID sent from the interaction control unit 612, if necessary.

In response to being called by a main agent 201, each expert agent 202 included in the expert agent unit 616 generates response contents in accordance with a purpose of a user 120 on behalf of the main agent 201 and provides the interaction control unit 612 with response data indicating the generated response contents.

Upon generating response contents, a main agent 201 and an expert agent 202 can obtain various information from the external server 150 through the communication unit 601.

A device 130 includes, for example, a device SDK (Software Development Kit) 620 provided by a service provider that operates the service providing system 100, and a basic process is performed by the device SDK 620.

Process Flow

Next, an ID managing method and a service providing method according to the first embodiment will be described.

Device Registering Process

Figure 7:
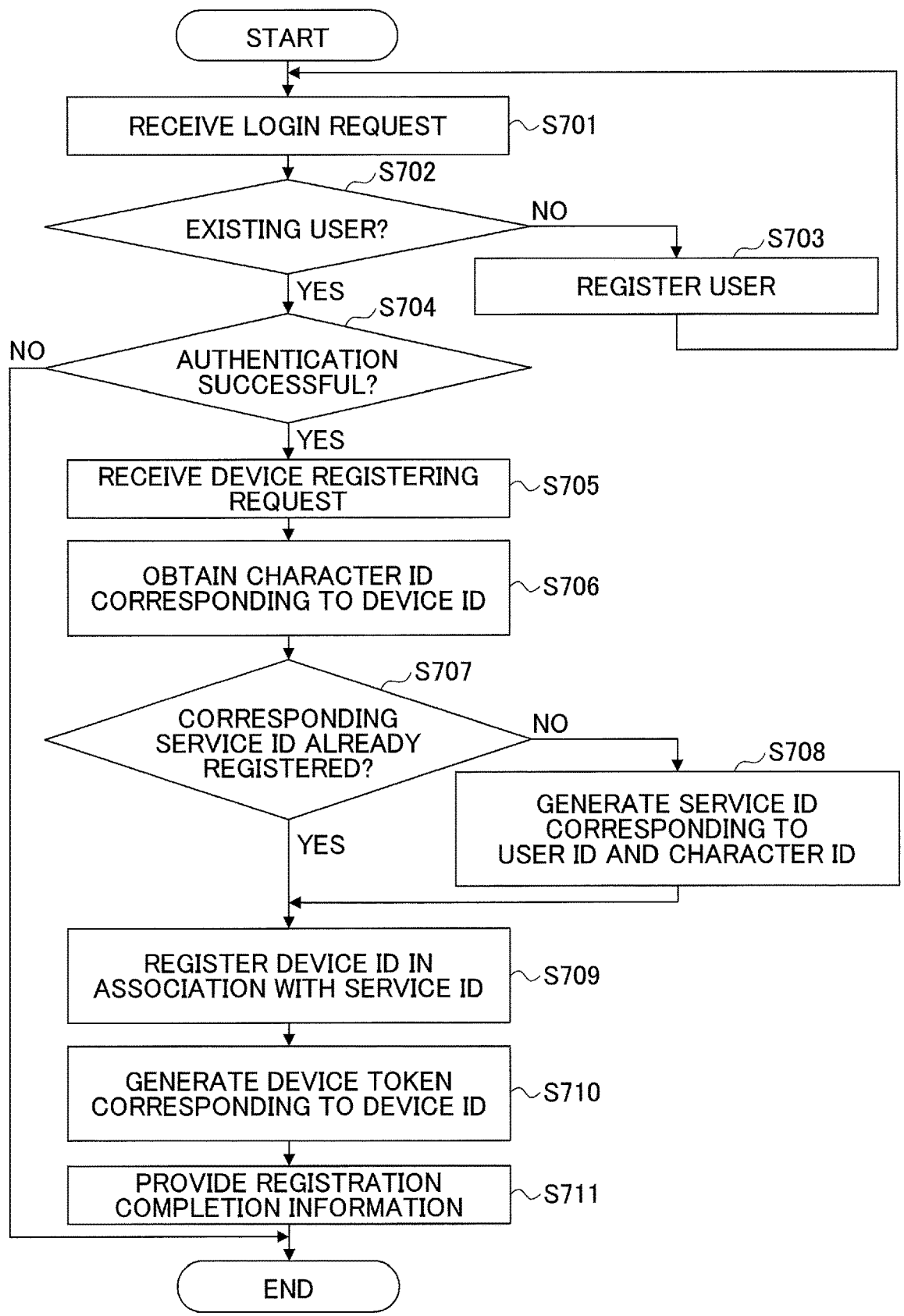
FIG. 7 is a flowchart illustrating an example of a device registering process according to the first embodiment.

FIG. 7 is a flowchart illustrating an example of a device registering process according to the first embodiment. FIG. 7 illustrates an example of a device registering process performed by the service providing apparatus 110 for a case where a user 120 registers a device 130 in the service providing system 100.

In step S701, in response to receiving a login request requesting login of a user 120 from, for example, the web browser 135 or the like of the terminal apparatus 133 used by the user 120, the service providing apparatus 110 proceeds to step S702. The login request may include, for example, a user ID identifying the user 120.

In step S702, the authentication unit 606 of the service providing apparatus 110 determines whether the user 120 requesting login is an existing user registered in the service providing system 100. For a case where the user 120 is an existing user, the authentication unit 606 proceeds to step S704. For a case where the user 120 is not an existing user, the authentication unit 606 registers the user 120 in step S703 and returns to step S701.

In step S704, the authentication unit 606 authenticates the user 120 who has requested login. For example, the authentication unit 606 performs OpenID Authentication on the user 120 using the external server 150 or the like. In response to successful authentication of the user 120, the service providing apparatus 110 proceeds to step S705. In response to failed authentication of the user 120, the service providing apparatus 110 ends the process.

In step S705, the device registration unit 603 of the service providing apparatus 110 receives a device registering request transmitted from the web browser 135 or the like of the terminal apparatus 133 used by the user 120. The device registering request includes, for example, a device ID of the device 130 to be registered.

In step S706, the ID management unit 604 of the service providing apparatus 110 obtains a character ID corresponding to the device ID included in the device registering request from, for example, the device management DB 301 illustrated in FIG. 3A.

In step S707, the ID management unit 604 determines whether the user ID of the user 120 and the service ID corresponding to the obtained character ID have been registered in, for example, the ID management DB 302 as illustrated in FIG. 3B. For a case where the user ID of the user 120 and the service ID corresponding to the obtained character ID are already registered, the ID management unit 604 proceeds to step S709. For a case where the user ID of the user 120 and the service ID corresponding to the obtained character ID are not registered, the ID management unit 604 proceeds to step S708.

In step S708, the ID management unit 604 newly generates a service ID corresponding to the user ID of the user 120 and the obtained character ID.

In step S709, the ID management unit 604 registers the service ID corresponding to the user ID and the character ID as well as the device ID of the device 130 to be registered in the ID management DB 302 in association with each other, for example as illustrated in FIG. 3B.

In step S710, the service providing apparatus 110 generates a device token corresponding to the device ID of the device 130. For example, the authentication unit 606 generates a device token that is authentication information for the device 130 to use a service provided by the service providing apparatus 110. The ID management unit 604 registers the information of the device token generated by the authentication unit 606 in the ID management DB 302 in association with the device ID of the device 130, for example as illustrated in FIG. 3B.

In step S711, the device registration unit 603 of the service providing apparatus 110 provides the source of the device registering request for the device 130 (for example, the web browser or the like of the terminal apparatus 133 used by the user 120) with information indicating completion of the registration of the device 130.

Device Activating Process

Figure 8:
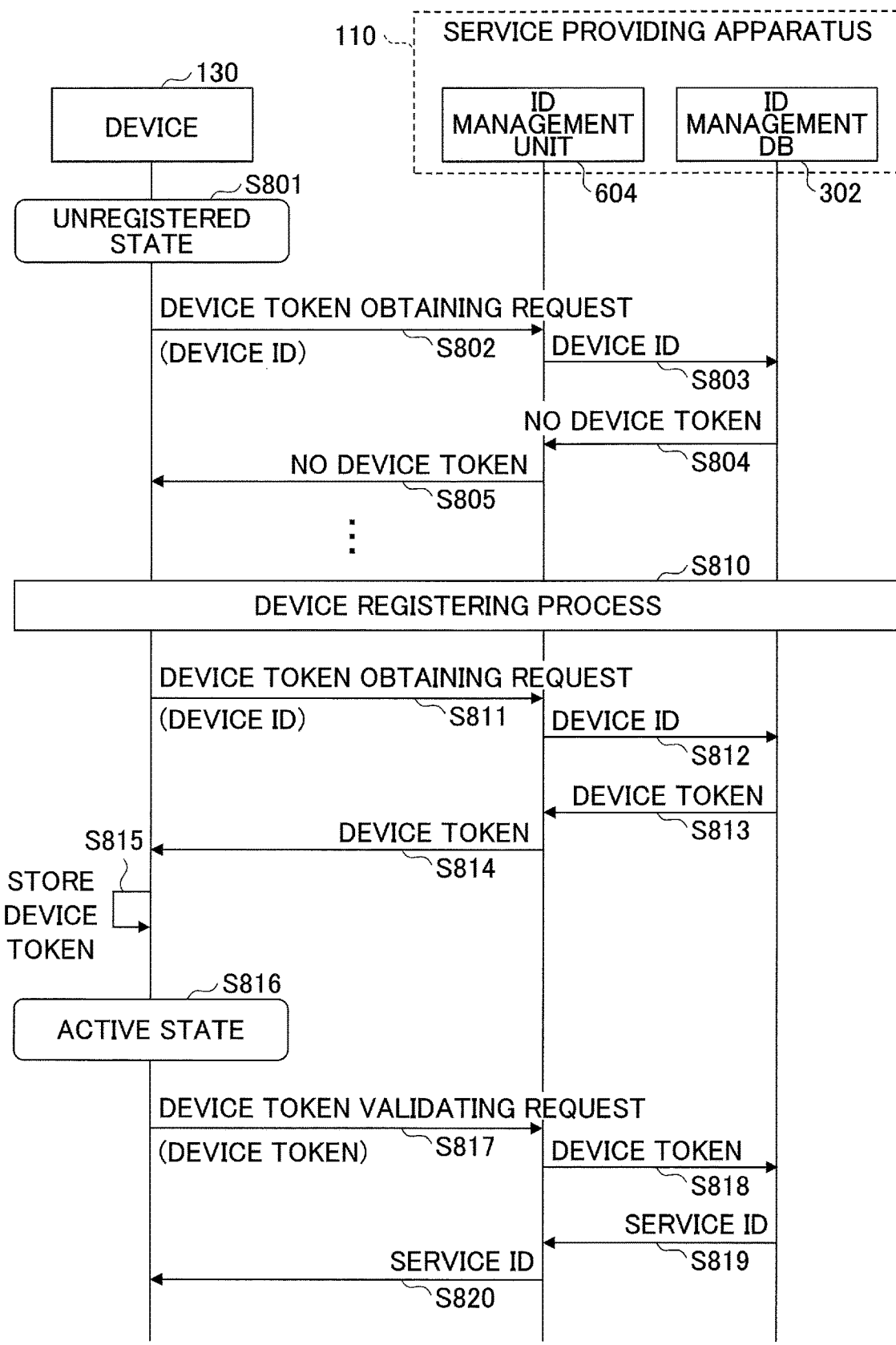
FIG. 8 is a sequence diagram illustrating an example of a device activating process according to the first embodiment.

FIG. 8 is a sequence diagram illustrating an example of a device activating process according to the first embodiment. FIG. 8 illustrates an example of a device activating process for causing an unregistered device 130 purchased by a user 120 to become active so that the user 120 can use the device 130 in the service providing system 100.

In step S801, a device 130 used by a user 120 is in an unregistered state where the device 130 is not registered in the service providing system 100.

In step S802, the device 130 transmits a device token obtaining request including a device ID to the service providing apparatus 110. In this regard, for a case where the device 130 has not been registered, the device SDK 620 of the device 130 automatically transmits a device token obtaining request to the service providing apparatus 110 at predetermined time intervals (for example, at 10 second intervals or the like).

In steps S803 and S804, in response to receiving the device token obtaining request, the ID management unit 604 of the service providing apparatus 110 tries to obtain a device token corresponding to the device ID included in the device token obtaining request from the ID management DB 302. In this regard, because the device 130 has not been registered in the service providing system 100, the ID management unit 604 cannot obtain a device token.

In step S805, the ID management unit 604 of the service providing apparatus 110 provides the requesting device 130 with information indicating that a device token has not been registered. The device 130 and the service providing apparatus 110 repeatedly perform steps S802 to S805 until a device registering process is performed in step S810.

In response to, for example, a device registering process for the device 130 illustrated in FIG. 7 being performed in step S810, the process proceeds to step S811.

In step S811, the device 130 transmits a device token obtaining request including the device ID to the service providing apparatus 110 similarly to step S802.

In steps S812 and S813, in response to receiving the device token obtaining request, the ID management unit 604 of the service providing apparatus 110 tries to obtain a device token corresponding to the device ID included in the device token obtaining request from the ID management DB 302. Because the device 130 has been already registered in the service providing system 100 through the device registering process of step S810, the ID management unit 604 can obtain a device token corresponding to the device ID of the device 130.

In step S814, the ID management unit 604 of the service providing apparatus 110 transmits the obtained device token to the requesting device 130.

In step S815, the device 130 stores the device token provided by the service providing apparatus 110 in a storage unit such as, for example, the storage 503 or the memory 502 of FIG. 5. Thus, in step S816, the device 130 enters an active state. The device 130 that has entered the active state performs a device token validating process as illustrated in steps S817-S820 at predetermined time intervals, for example.

In step S817, the device 130 transmits a device token validating request including the device token to the service providing apparatus 110.

In steps S818 and S819, in response to receiving the device token validating request, the ID management unit 604 of the service providing apparatus 110 receives a service ID corresponding to the device token included in the device token validating request from the ID management DB 302.

In step S820, the ID management unit 604 of the service providing apparatus 110 transmits the obtained service ID to the requesting device 130.

In response to thus being able to obtain the service ID corresponding to the device token, the device 130 determines that the device token is valid and maintains the active state.

In the active state, the device 130 may use the device token or the obtained service ID to use a service provided by the service providing apparatus 110 (for example, a voice interaction service).

Device Deleting Process

Figure 9:
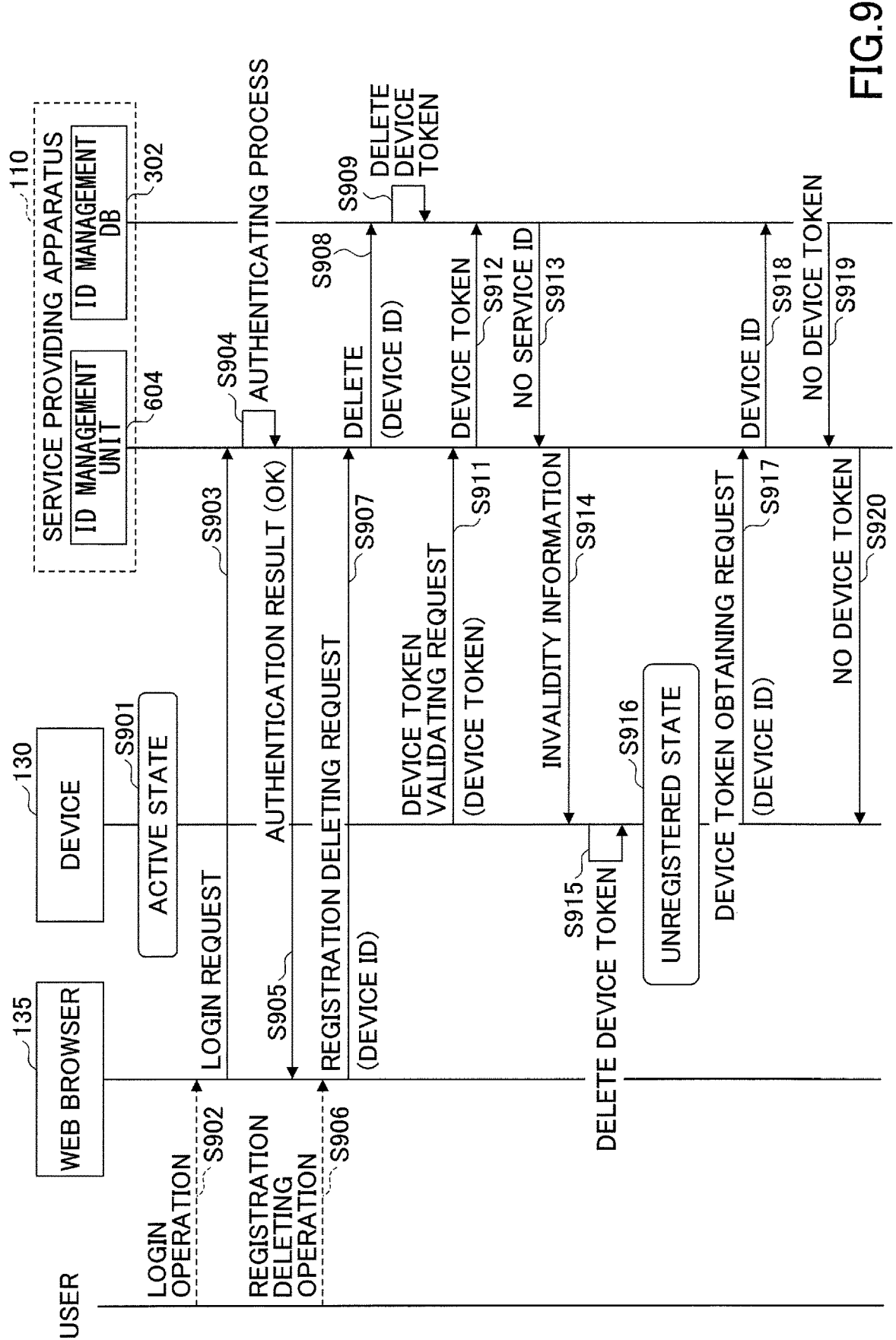
FIG. 9 is a sequence diagram illustrating an example of a device deleting process according to the first embodiment.

FIG. 9 is a sequence diagram illustrating an example of a device deleting process according to the first embodiment. FIG. 9 illustrates an example of a device deleting process where a user 120 deletes, from the service providing apparatus 110, registration of a device 130 that has entered an active state by a device activating process illustrated in FIG. 8.

In step S901, a device 130 used by a user 120 is in an active state where a device token registered in the service providing system 100 and provided by the service providing apparatus 110 is stored in the storage unit.

In step S902, the user 120 performs a login operation requesting login to the service providing apparatus 110 using, for example, the web browser 135 or the like of the terminal apparatus 133 used by the user 120. For example, the user 120 connects to a web server provided by the service providing apparatus 110 using the web browser 135 and performs a login operation.

In step S903, for example, the web browser 135 of the terminal apparatus 133 transmits a login request requesting login of the user 120 to the service providing apparatus 110.

In step S904, the ID management unit 604 of the service providing apparatus 110 performs login authentication of the user 120 by, for example, OpenID Authentication using the authentication unit 606.

In response to failed login authentication, the ID management unit 604 transmits an authentication result (NG) indicating that the authentication fails to the web browser 135 to end the process. In response to successful login authentication, the ID management unit 604 transmits an authentication result (OK) indicating that the login authentication is successful to the web browser 135 in step S905. As a result, the process proceeds to step S906.

Steps S903-S905 may be executed mainly by the authentication unit 606 of the service providing apparatus 110.

In step S906, for example, the user 120 performs a registration deleting operation to request deletion of registration of the device 130 using the web browser 135 or the like.

In step S907, in response to receiving the registration deleting operation from the device 130, the web browser 135 transmits a registration deleting request including the device ID of the device 130 to the service providing apparatus 110.

In steps S908-S909, the ID management unit 604 of the service providing apparatus 110 deletes, from the ID management DB 302 for example illustrated in FIG. 3B, the device ID included in the received registration deleting request and the device token corresponding to the device ID.

In step S911, as described above, the device 130 transmits a device token validating request to the service providing apparatus 110 at predetermined time intervals.

In steps S912 and S913, in response to receiving the device token validating request, the ID management unit 604 of the service providing apparatus 110 tries to obtain the service ID corresponding to the device token included in the device token validating request from the ID management DB 302. In this regard, because the device token of the device 130 has been deleted in step S909, the ID management unit 604 cannot obtain the service ID corresponding to the device token of the device 130.

In step S914, the ID management unit 604 of the service providing apparatus 110 transmits invalidity information indicating that the device token is invalid to the requesting device 130.

In step S915, in response to receiving the invalidity information, the device 130 deletes the invalid device token from the storage unit. As a result, in step S916, the device 130 enters an unregistered state.

The device 130 that has entered the unregistered state repeatedly performs a device token obtaining process illustrated in steps S917-S920 at predetermined time intervals, for example. Because the device token obtaining process illustrated in steps S917-S921 is the same as the process illustrated in steps S802-S805 in FIG. 8, the description will not be repeated.

Service Providing Process

Figure 10:
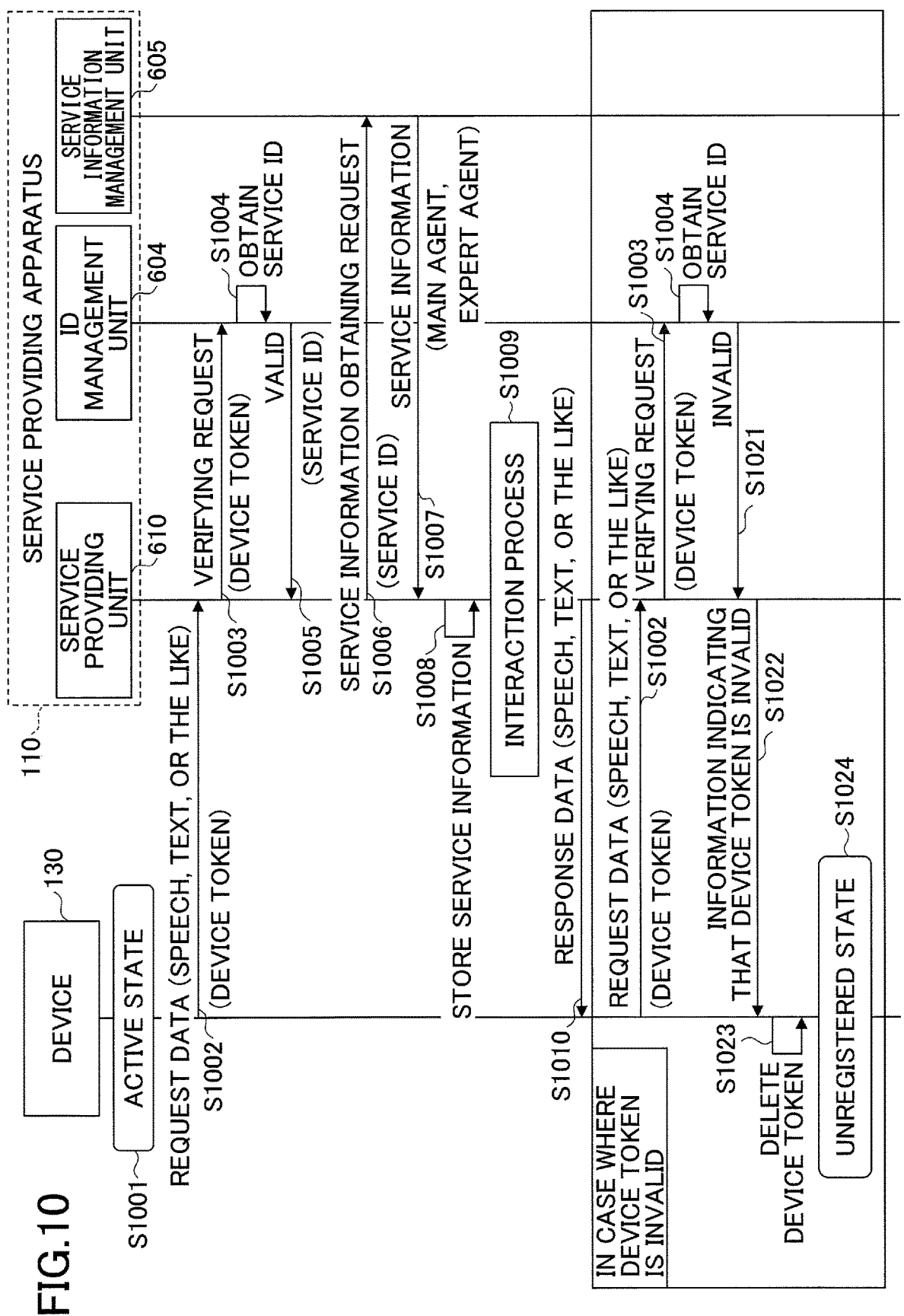
FIG. 10 is a sequence diagram illustrating an example of a service providing process according to the first embodiment.

FIG. 10 is a sequence diagram illustrating an example of a service providing process according to the first embodiment. FIG. 10 illustrates an example of a service providing process where the service providing apparatus 110 provides a service to a device 130 in an active state. Below, it is assumed that a service provided by the service providing apparatus 110 is a voice or text natural interaction service.

In step S1001, a device 130 used by a user 120 is in an active state.

In step S1002, in response to, for example, a speech or text being input to the device 130 by the user 120, the device 130 transmits request data including the input speech or text to the service providing apparatus 110. In the example of FIG. 10, the request data includes, for example, the device token stored in the storage unit in step S815 of FIG. 8.

In step S1003, in response to receiving the request data including the device token, the service providing unit 610 of the service providing apparatus 110 provides the ID management unit 604 with a verifying request requesting verification of the device token.

In step S1004, the ID management unit 604 of the service providing apparatus 110 obtains the service ID corresponding to the device token included in the verifying request from the ID management DB 302, for example, illustrated in FIG. 3B.

In step S1005, in response to obtaining the service ID, the ID management unit 604 provides the service providing unit 610 with information indicating that the device token is valid and with the obtained service ID.

Steps S1002-S1005 are an example. As another example, in step S1002, the request data transmitted by the device 130 may include the service ID obtained in step S820 of FIG. 8 instead of the device token. In this case, steps S1003-S1005 of FIG. 10 can be omitted.

In step S1006, the service providing unit 610 of the service providing apparatus 110 requests service information corresponding to the provided service ID from the service information management unit 605.

In step S1007, the service information management unit 605 of the service providing apparatus 110 obtains information of a service corresponding to the service ID (for example, a main agent, an expert agent, or the like) from the service management DB 303, for example, illustrated in FIG. 3C. The service information management unit 605 provides the service providing unit 610 with the obtained service information.

In step S1008, the service providing unit 610 stores the service information provided by the service information management unit 605 in the storage unit 607 in association with the service ID. Thus, for example, during the same session, the service providing unit 610 can obtain the service information corresponding to the service ID from the storage unit 607 while omitting steps S1006 and S1007.

In steps S1009 and S1010, the service providing unit 610 executes, for example, an interaction process (an interaction service), described in FIG. 2 for example, using a main agent 201 and an expert agent 202 included in the service information stored in the storage unit 607. For example, in step S1009, the service providing unit 610 generates response data (speech or text) responding to the speech or text included in the request data in step S1009 using the main agent 201 or the expert agent 202. The service providing unit 610 transmits the generated response data (speech or text) to the device 130 in step S1010.

Preferably, the service providing unit 610 requests the main agent 201 or the expert agent 202 to provide a service (a natural interaction service) using a service ID. As a result, in the service providing system 100, it is difficult for a third vendor that provides an interaction service by an expert agent, for example, to identify the requesting user.

In response to not being able to obtain the service ID corresponding to the device token included in the request data in step S1004 of FIG. 10, the ID management unit 604 executes a process prepared for a case where the device token illustrated in steps S1021-S1024 is invalid.

In step S1021, in response to not being able to obtain the service ID, the ID management unit 604 provides the service providing unit 610 with information indicating that the device token is invalid.

In step S1022, the service providing unit 610 provides the device 130 with information indicating that the device token included in the request data is invalid.

In step S1023, the device 130 deletes, from the storage unit, the device token for which the information indicating that the device token is invalid has been thus provided. As a result, in step S1024, the device 130 enters an unregistered state.

Thus, the service providing apparatus 110 can provide a device 130 having a valid device token with an interaction service identified by a service ID corresponding to the device token.

Service Registering Process

Figure 11:
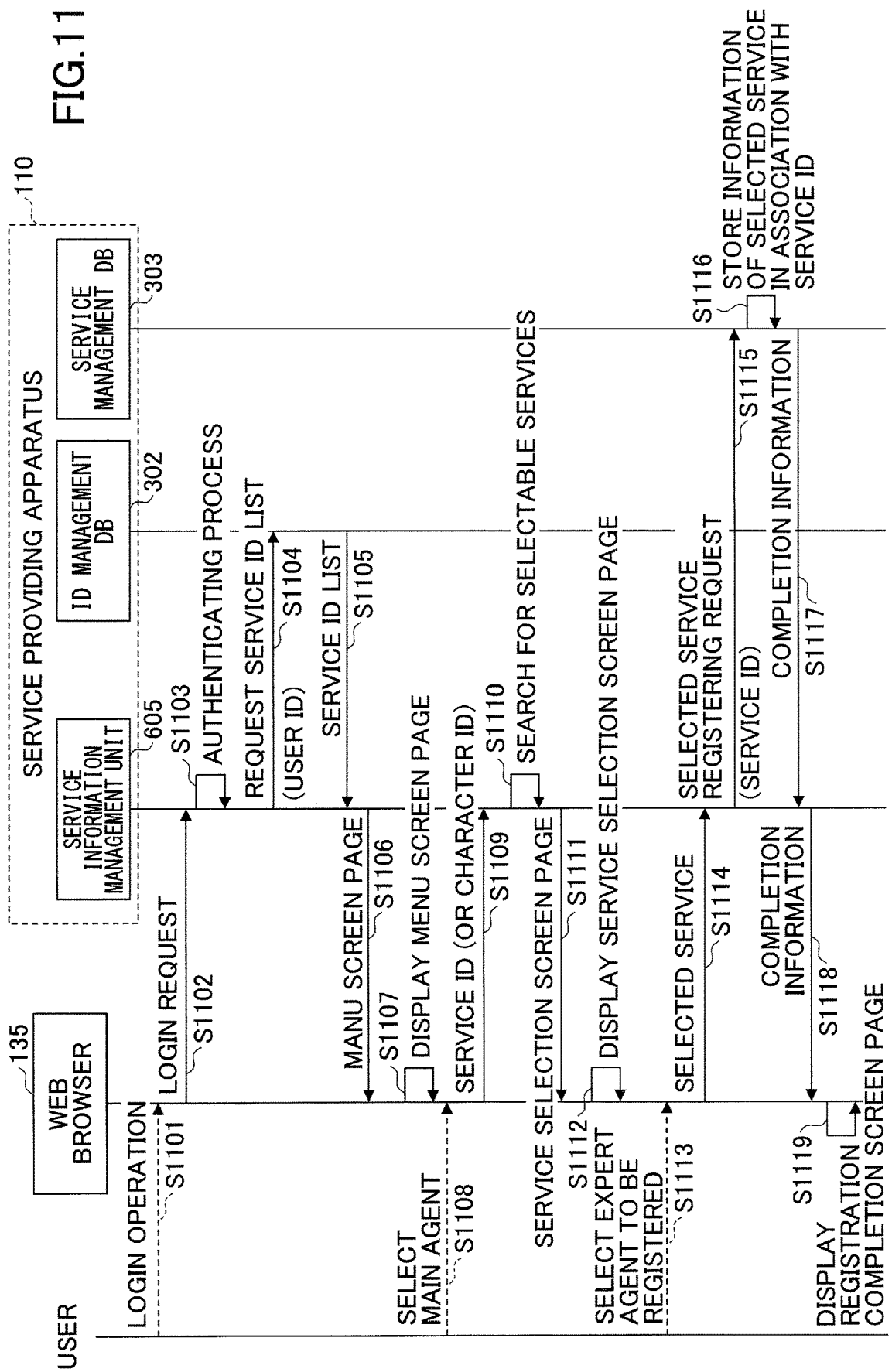
FIG. 11 is a sequence diagram illustrating an example of a service registering process according to the first embodiment.

FIG. 11 is a sequence diagram illustrating an example of a service registering process according to the first embodiment. FIG. 11 illustrates an example of a service registering process where a user 120 registers an expert agent in association with a main agent.

In step S1101, a user 120 performs a login operation requesting login to the service providing apparatus 110 using, for example, the web browser 135 or the like of the terminal apparatus 133 used by the user 120. For example, the user 120 accesses, using the web browser 135, a web page prepared for registering an expert agent provided by the service information management unit 605, and performs a login operation.

In step S1102, the web browser 135 transmits a login request requesting login of the user 120 to the service providing apparatus 110.

In step S1103, the service information management unit 605 of the service providing apparatus 110 performs login authentication of the user 120 by, for example, OpenID Authentication using the authentication unit 606.

In response to failed login authentication, the service information management unit 605 transmits an authentication result (NG) indicating that authentication fails to the web browser 135 to end the process. In response to successful login authentication, the service information management unit 605 executes steps S1104 and S1105.

In steps S1104 and S1105, the service information management unit 605 obtains a list of service IDs corresponding to the user ID of the user 120 for which the authentication has been successful from the ID management DB 302, for example, illustrated in FIG. 3B.

In steps S1106 and S1107, the service information management unit 605 generates a menu screen page selectively displaying main agents corresponding to the obtained list of service IDs and causes the web browser 135 to display the menu screen page. The service information management unit 605 can obtain the character IDs corresponding to the service IDs from the ID management DB 302 and identify the main agents corresponding to the obtained character IDs from the service management DB 303.

In step S1108, the user 120 selects a main agent to be registered for registering an expert agent from the menu screen displayed by the web browser 135.

In step S1109, the web browser 135 transmits the service IDs or the character ID corresponding to the main agent selected from the menu screen to the service providing apparatus 110.

In step S1110, the service information management unit 605 searches for the services selectable by the user 120. For example, the service information management unit 605 searches for the list of expert agents that can be called by the main agent selected by the user 120.

In steps S1111 and S1112, the service information management unit 605 displays, using the web browser 135, a screen page for selecting a service to select an expert agent, from among the expert agents having been searched for, to be registered in association with the main agent.

In step S1113, the user 120 selects an expert agent to be registered in association with the main agent from the screen page displayed by the web browser 135.

In step S1114, the web browser 135 transmits the information of the selected expert agent (service) to the service providing apparatus 110.

In steps S1115 and S1116, the service information management unit 605 of the service providing apparatus 110 registers the selected expert agent (service) in the service management DB 303 in association with the service ID, for example illustrated in FIG. 3C.

In response to completion of the registration of the selected expert agent in step S1117, the service information management unit 605 displays a registration completion screen page indicating that the registration is completed using the web browser 135 in steps S1118 and S1119.

Thus, the service information management unit 605 can store and manage information of expert agents in the service management DB 303 illustrated in FIG. 3C.

Through the processes illustrated in FIGS. 7-11, the service providing apparatus 110 can manage the ID management DB 302 and the service management DB 303, for example as illustrated in FIGS. 3B and 3C. Thus, the service providing apparatus 110 can provide a natural interaction service, for example as illustrated in FIG. 2, to the user 120 using the device 130, using the ID management DB 302 and the service management DB 303.

Further, in the service providing apparatus 110 according to the present embodiment, with the use of the ID management DB 302 and the service management DB 303, it is easy to provide the same natural interaction services to a plurality of devices 130 having the same characters used by a user 120. Further, in the service providing apparatus 110 according to the present embodiment, with the use of the ID management DB 302 and the service management DB 303, it is easy to provide different services to devices 130 having different characters used by a user 120.

Device Token Updating Process

Figure 12:
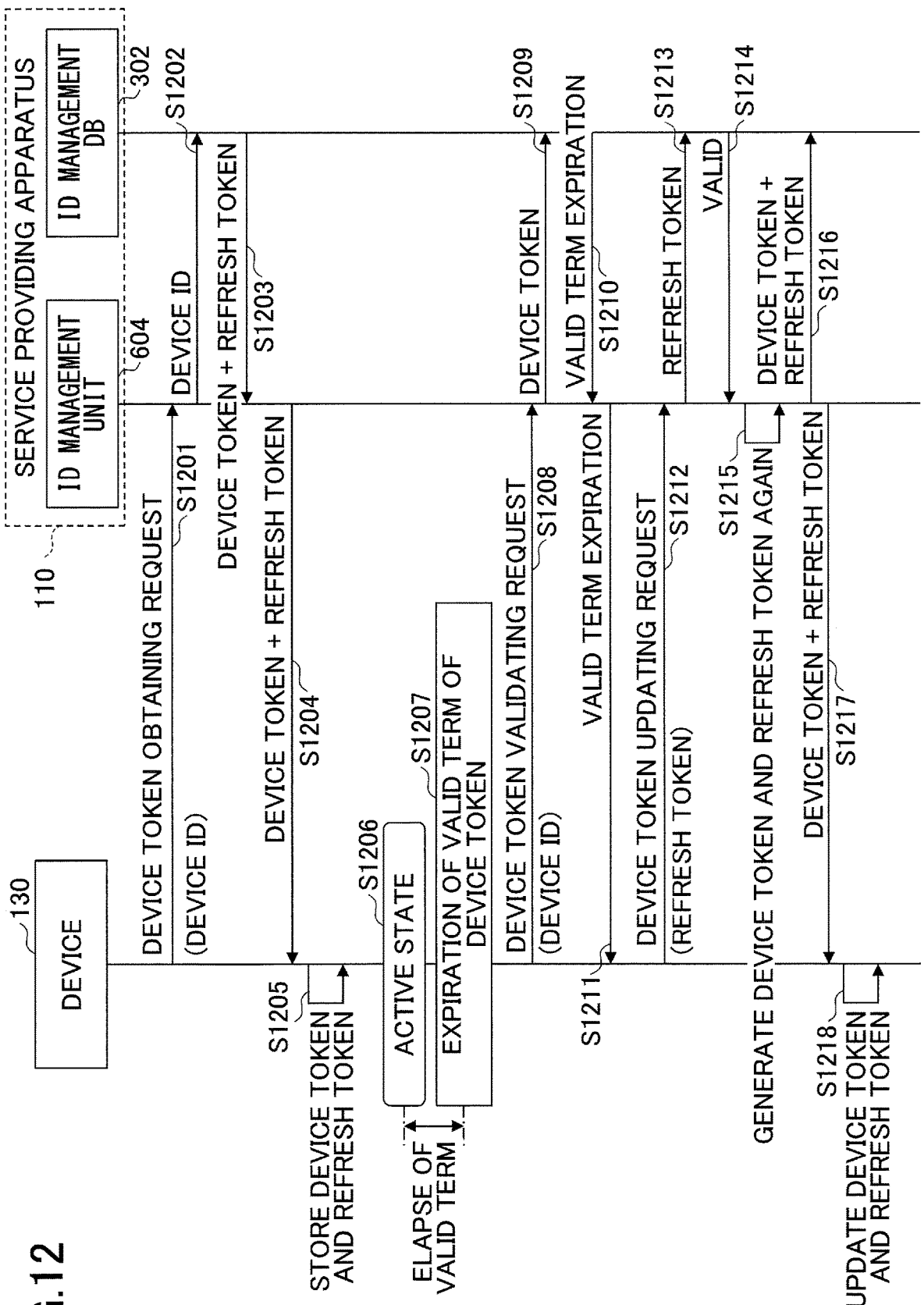
FIG. 12 is a sequence diagram illustrating an example of a device token updating process according to the first embodiment.

FIG. 12 is a sequence diagram illustrating an example of a device token updating process according to the first embodiment. The service providing apparatus 110 may periodically update a device token of a device 130 by, for example, a device token updating process illustrated in FIG. 12. Below, it is assumed that, for example, at a start of a process illustrated in FIG. 12, a device registering process illustrated in FIG. 7 has been completed.

In step S1201, a device 130 transmits a device token obtaining request including a device ID to the service providing apparatus 110.

In steps S1202 and S1203, the ID management unit 604 obtains a device token corresponding to the device ID included in the received device token obtaining request and a refresh token used for updating the device token, from the ID management DB 302.

A valid term is set for the device token. The ID management unit 604 stores and manages the device token and the refresh token in the ID management DB 302.

In step S1204, the ID management unit 604 provides the device 130 with the obtained device token and refresh token.

In step S1205, the device 130 stores the provided device token and refresh token in the storage unit. As a result, in step S1206, the device 130 enters an active state.

In step S1207, it is assumed that a predetermined valid term has elapsed since the device 130 entered the active state; and a valid term of the device token stored in the storage unit by the device 130 has expired.

In step S1208, the device 130 transmits a device token validating request to the service providing apparatus 110.

In steps S1209 and S1210, the ID management unit 604 of the service providing apparatus 110 tries to obtain a service ID corresponding to the device token included in the device token validating request from the ID management DB 302. Because the valid term of the device token has expired, the ID management unit 604 cannot obtain a service ID corresponding to the device token.

In step S1211, the ID management unit 604 provides the device 130 with information indicating that the valid term of the device token has expired.

In step S1212, the device 130 transmits a device token updating request to the service providing apparatus 110, including the refresh token for updating the device token for which the valid term has expired.

In steps S1213 and S1214, the ID management unit 604 of the service providing apparatus 110 determines whether the refresh token included in the device token updating request is valid. In a case where the refresh token is valid, the ID management unit 604 proceeds to step S1215. In a case where the refresh token is invalid, the ID management unit 604 provides the device 130 with information indicating that the refresh token is invalid; and ends the process.

In step S1215, the ID management unit 604 again generates a device token and a refresh token for the device 130 using, for example, the authentication unit 606.

In step S1216, the ID management unit 604 stores the thus generated device token and refresh token in the ID management DB 302 in association with the device ID of the device 130.

In step S1217, the ID management unit 604 transmits the thus generated device token and refresh token to the device 130. In step S1218, the device 130 stores the provided device token and refresh token in the storage unit.

Thus, the service providing system 100 can periodically update a device token generated for a device 130.

Thus, according to the present embodiment, it is easy to provide the same services to a plurality of devices 130 having the same characters used by a user 120 and to provide different services to devices 130 having different characters used by the user 120.

Second Embodiment

Concerning a second embodiment, an example where a device 130 used by a user 120 is the terminal apparatus 133 that executes a predetermined application will be described.

Figure 13:
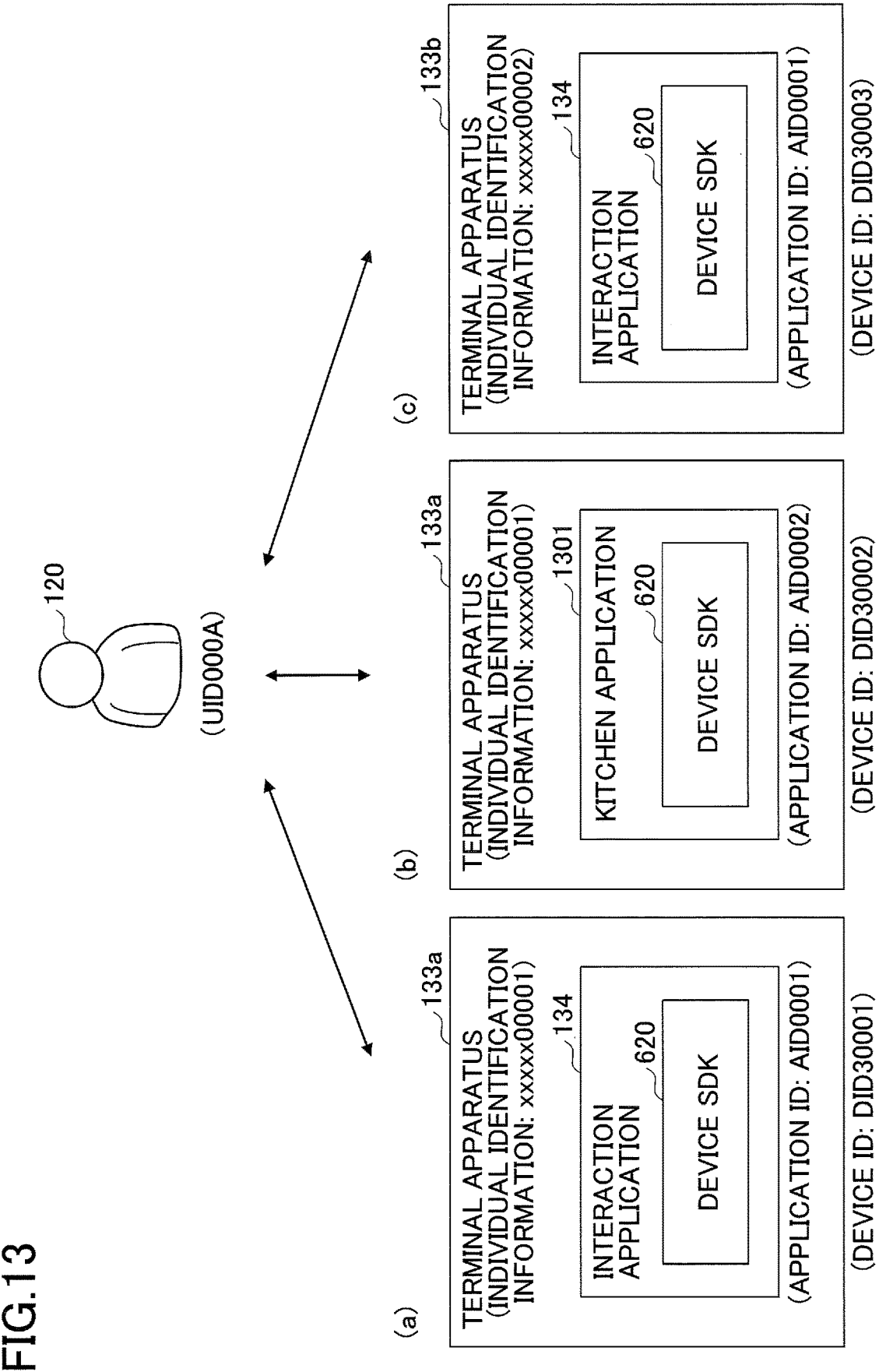
FIG. 13 illustrates devices according to a second embodiment.

FIG. 13 illustrates devices according to the second embodiment. In FIG. 13, (a), a terminal apparatus 133a used by a user 120 executes an interaction application 134 having the same character as the interaction devices 131a and 131b of FIG. 1. In FIG. 13, (b), the terminal apparatus 133a used by the user 120 executes a kitchen application 1301 having the same character as the kitchen home electrical appliance 132 of FIG. 1. As described above, in a case where the terminal apparatus 133a executes one application and the same terminal apparatus 133a executes another application, the service providing apparatus 110 manages, as different devices 130, the terminal apparatus 133a that executes the one application and the same terminal apparatus 133a that executes the another application.

For example, as illustrated in FIG. 13, (a), in response to the terminal apparatus 133a executing the interaction application 134, the device information management unit 602 manages the terminal apparatus 133a executing the interaction application 134 as a device 130 of a device ID "DID30001". As illustrated in FIG. 13, (b), in response to the terminal apparatus 133a executing the kitchen application 1301, the device information management unit 602 manages the terminal apparatus 133a executing the kitchen application 1301 as a device 130 of a device ID "DID30002".

The interaction application 134 is an example of a first program that provides a first interaction service corresponding to a first character; and the device 130 having the device ID "DID30001" is an example of a first device. The kitchen application 1301 is an example of a second program that provides a first interaction service corresponding to a second character different from the first character. The device 130 having the device ID "DID30002" is an example of a second device different from the first device.

In FIG. 13, (c), another terminal apparatus 133b used by the user 120 executes an interaction application 134 having the same character as the interaction devices 131a and 131b of FIG. 1. Thus, even for a case where the same interaction applications 134 are executed by the terminal apparatuses 133a and 133b used by the same user 120, the device information management unit 602 manages the terminal apparatus 133a and the terminal apparatus 133b as separate from one another because these terminal apparatuses 133 are different devices.

For example, as illustrated in FIG. 13, (c), the device information management unit 602 of the service providing apparatus 110 manages the terminal apparatus 133b that executes the interaction application 134 as a device 130 of a device ID "DID30003" while the terminal apparatus 133b executes the interaction application 134.

The interaction applications 134 and the kitchen application 1301 include functions of the device SDK 620 or functions similar to the device SDK 620 as in devices 130 of the first embodiment. Further, the interaction applications 134 and the kitchen application 1301 have application IDs that identify the applications.

FIGS. 14A and 14B illustrate examples of information managed by the service providing apparatus according to the second embodiment. The device information management unit 602 of the service providing apparatus 110 according to the second embodiment stores and manages a device management DB 1401, for example, illustrated in FIG. 14A, in the storage unit 607.

For example, the device information management unit 602 previously stores correspondence relationships between application IDs for identifying respective applications and character IDs for identifying characters of the respective applications. The device information management unit 602 receives a device registering request including individual identification information and an application ID from a terminal apparatus 133 and, in response to successful authentication, generates a device ID corresponding to a combination of the individual identification information and the application ID. For example, as illustrated in FIG. 14A, the device information management unit 602 manages generated device IDs in association with items of individual identification information, application IDs, and character IDs corresponding to the application IDs.

Thus, the device information management unit 602 according to the second embodiment can manage terminal apparatuses 133 that execute predetermined applications as devices 130 and can manage device IDs of the devices 130 in association with characters IDs.

Thus, the ID management unit 604 of the service providing apparatus 110 can manage terminal apparatuses 133 that execute predetermined applications in the same manner as devices 130 according to the first embodiment, using device IDs, for example as illustrated in FIG. 14B.

For example, in the examples of FIGS. 14A and 14B, the terminal apparatus 133a of the individual identification information "xxxx000001" that executes the interaction application 134 of an application ID "AID0001" is managed as a device 130 having a device ID "DID30001". The device ID "DID30001" is managed in association with a user ID "UID000A," a service ID "SID0011," and a device token "Token10005".

The functional configuration of the service providing apparatus 110 other than that described above may be the same as the functional configuration of the service providing apparatus 110 according to the first embodiment illustrated in FIG. 6.

Process Flow

FIG. 15 is a sequence diagram illustrating an example of a device activating process according to the second embodiment. FIG. 15 illustrates an example of activating a device 130, which is a terminal apparatus 133 that executes a predetermined application, such as an interaction application 134, to an active state where the device 130 can be used in the service providing system 100. At a start of the process illustrated in FIG. 15, the device 130 is in an unregistered state where the device 130 is not registered in the service providing system 100. In the following description, a "device 130" is a terminal apparatus 133 that executes a predetermined application, such as an interaction application 134, a kitchen application 1301, or the like.

In step S1501, a device 130 in an unregistered state transmits a device ID generating request to the service providing apparatus 110. The device ID generating request includes, for example, an application ID for identifying a predetermined application executed by the terminal apparatus 133 and individual identification information for identifying the terminal apparatus 133. The device ID generating request may include authentication information such as a password (PW).

In step S1502, the device information management unit 602 of the service providing apparatus 110 generates a device ID in response to the device ID generating request. For example, as illustrated in FIG. 14A, the device information management unit 602 stores the generated device ID in the device management DB 1401 in association with the individual identification information and the application ID included in the device ID generating request, the character ID corresponding to the application ID, and so forth.

Preferably, the device information management unit 602 generates the device ID for a case where the device ID generating request includes predetermined authentication information.

In step S1503, the device information management unit 602 of the service providing apparatus 110 provides the device 130 with the generated device ID.

In steps S1504 and S1505, the ID management unit 604 of the service providing apparatus 110 causes the device 130 to display a login screen page.

In step S1506, a user 120 using the device 130 performs a login operation from the displayed login screen page.

In step S1507, the device 130 transmits a login request requesting login to the service providing apparatus 110 to the service providing apparatus 110.

In step S1508, the ID management unit 604 of the service providing apparatus 110 requests the authentication unit 606 to authenticate the device 130 requesting a login.

In step S606, the authentication unit 606 performs the device 130 (for example, OpenID Authentication) and, in response to successful authentication, provides the ID management unit 604 with a service token that is authentication information for accessing the service providing apparatus 110. In response to failed authentication, the authentication unit 606 provides the ID management unit 604 with information indicating that the authentication fails. It will now be assumed that the authentication is successful.

In step S1511, the ID management unit 604 provides the device 130 with information indicating that the login has been successful and with a cookie including the service token.

In step S1511, the device 130 transmits a device registering request including the device ID and the cookie provided by the service providing apparatus 110 to the service providing apparatus 110.

In step S1513, in response to receiving the device registering request including the valid cookie, the ID management unit 604 of the service providing apparatus 110 performs a device registering process, for example, illustrated in steps S706-S710 of FIG. 7.

In step S1514, the ID management unit 604 provides the device 130 with completion information indicating that the device registering process is completed.

In step S1515, the device 130 transmits a device token obtaining request including the device ID to the service providing apparatus 110.

In steps S1516 and S1517, in response to receiving the device token obtaining request, the ID management unit 604 of the service providing apparatus 110 obtains a device token corresponding to the device ID included in the device token obtaining request from the ID management DB 302.

Because the device 130 is registered in the service providing system 100 through the device registering process of step S1513, the ID management unit 604 can obtain a device token corresponding to the device ID of the device 130.

In step S1518, the ID management unit 604 of the service providing apparatus 110 provides the obtained device token to the requesting device 130.

In step S1519, the device 130 stores the device token provided by the service providing apparatus 110 in a storage unit such as, for example, the storage 503 or the memory 502 of FIG. 5. As a result, in step S1520, the device 130 enters an active state.

Thus, the service providing apparatus 110 can store and manage the device ID in the ID management DB 302 in association with the user ID, the character ID, the service ID, and the device token, for example, as illustrated in FIG. 14B.

According to the second embodiment, a terminal apparatus 133 that executes a predetermined application can be managed as a device 130, for example, in a manner similar to the interaction device 131a or 131b, the kitchen home electrical appliance 132, or the like, of FIG. 1. The service providing process and the service registering process according to the second embodiment may be the same as those according to the first embodiment. The second embodiment may be implemented in combination with the first embodiment.

Thus, according to the embodiments of the present invention, it is easy to provide the same services to a plurality of devices 130 having the same characters used by a user 120 and to provide different services to devices 130 having different characters used by the user 120.

Supplement

The functional configuration diagram of FIG. 6 illustrates blocks of functional units. These functional blocks (functional configuration) are implemented by any combination of hardware and/or software. In addition, a unit for implementing each functional block is not particularly limited. That is, each functional block may be implemented by one device that is a physical and/or logical combination and may be implemented by two or more devices that are physically and/or logically separated and directly and/or indirectly connected (for example, wired and/or wireless connected).

The hardware configurations of the service providing apparatus 110 and the device 130 illustrated in FIGS. 4 and 5 may be configured to include one or more of the devices illustrated in the drawings and may be configured without including some of the devices. The service providing apparatus 110 and the device 130 may be configured to include hardware such as microprocessors, digital signal processors (DSP), application specific integrated circuits (ASIC), programmable logic devices (PLD), field programmable gates (FPGA), or the like, and some or all of the functional blocks may be implemented by such a type of hardware. For example, the processors 401 and 501 may be implemented by at least one of these types of hardware.

Each of the aspects/embodiments described herein may be applied to a system using a suitable system such as LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or the like; and/or to a next generation system extended on the basis thereof.

Concerning the process steps, sequences, flowcharts, and so forth of each of the aspects/embodiments described herein, the orders may be changed unless there occurs any conflict. For example, the methods described herein use various steps in exemplary orders and are not limited to these particular orders.

Input or output information may be stored in a specific location (for example, memory) or managed in a management table. Input or output information may be overwritten, updated, or added with information. Output information or the like may be deleted. Input information or the like may be transmitted to another apparatus.

A determination may be performed with the use of a value expressed in 1 bit (0 or 1), with the use of a true or false value (Boolean), or with the use of a numerical comparison (for example, a comparison with a predetermined value).

The aspects/embodiments described herein may be used alone, in combination, or switched upon implementation. Providing of predetermined information (for example, providing of information indicating "X") may be implemented by not only explicitly but also implicitly (for example, may be implemented by not providing predetermined information).

Software should be broadly interpreted to mean, whether it is referred to as software, firmware, middleware, microcode, hardware description language, or any other name, instructions, sets of instructions, codes, code segments, program codes, programs, subprograms, software modules, applications, software applications, software packages, routines, subroutines, objects, executable files, executable threads, procedures, functions, and so forth.

Software, instructions, or the like may be transmitted and received via a transmission medium. For example, in a case where software is transmitted from a website, server, or other remote source using a wired technology such as a coaxial cable, a fiber optic cable, a twisted pair, or a digital subscriber line (DSL), and/or a wireless technology such as infrared, wireless, or microwave, these wired technologies and/or wireless technologies are included within the definition of a transmission medium.

The information, signals, or the like described herein may be expressed with the use of any one of a variety of different technologies. For example, the data, instructions, commands, information, signals, bits, symbols, chips, or the like that may be described throughout herein may be expressed by voltages, currents, electromagnetic waves, magnetic fields or magnetic particles, optical fields or photons, or any combinations thereof.

The terms described herein and/or terms necessary for understanding the descriptions herein may be replaced by terms having the same or similar meanings. For example, a channel and/or a symbol may be a signal. A signal may be a message. A component carrier (CC) may be referred to as a carrier frequency, cell, or the like.

The terms "system" and "network" used herein may be used interchangeably.

The information, parameters, and so forth described herein may be expressed in absolute values, relative values from predetermined values, or in corresponding different information. For example, a wireless resource may be indicated by an index.

The names used for the parameters described herein are not restrictive in any respect. Moreover, the mathematical equations using these parameters may differ from those explicitly discussed herein. Because various channels (for example, PUCCH, PDCCH, and so forth) and information elements (for example, TPC, and so forth) can be identified by any suitable names, various names assigned to these various channels and information elements are not restrictive in any respect.

Terminal apparatuses may be referred to by those skilled in the art as subscriber stations, mobile units, subscriber units, wireless units, remote units, mobile devices, wireless devices, wireless communication devices, remote devices, mobile subscriber stations, access terminals, mobile terminals, wireless terminals, remote terminals, handsets, user agents, mobile clients, clients, or some other suitable terms.

The term "based on" or "on the basis of" used herein does not mean "solely based on" or "solely on the basis of" unless otherwise specified. In other words, the expression "based on" or "on the basis of" means both "solely based on" or "solely on the basis of" and "at least based on" or "at least on the basis of".

As long as "including", "comprising", and variations thereof are used herein or in the claims, these terms are intended to be generic as the term "provided with". Moreover, the term "or" used herein or in the claims is not intended to mean an exclusive OR.

In the entirety of the disclosure herein, in a case where an article has been added by translation, for example a, an, or the in English, the article is to be intended to mean not only an article for a single thing but also an article for a plurality of things unless the context clearly means otherwise.

Although the invention has been described in detail herein, those skilled in the art will appreciate that the invention is not limited to the embodiments described herein. The invention may be implemented in modifications or variations without departing from the spirit and scope of the invention defined by the appended claims. Accordingly, the description herein is for purposes of illustration and is not intended to have any restrictive purposes with respect to the present invention.

This application claims priority under Japanese Patent Application No. 2018-115493, filed with the Japan Patent Office on Jun. 18, 2018, the entire contents of which are incorporated herein by reference.

DESCRIPTION OF REFERENCE SIGNS

100 Service providing system
110 Service providing apparatus
120 User
130 Device
133 Terminal apparatus
134 Interaction application (first program)
201 Main agent (first interaction service)
202 Expert agent (second interaction service)
602 Device information management unit (first management unit)
604 ID management unit (second management unit)
606 Authentication unit
610 Service providing unit
1301 Kitchen application (second program)

The invention claimed is:
1. A service providing apparatus comprising:
a processor coupled to a memory, the processor configured to:
manage items of device identification information for identifying devices used by users and items of character identification information for identifying characters of the devices, in such a manner that the items of device identification information are associated with the items of character identification information;
manage, for each of the users, one or more items of service identification information that identify services corresponding to an item of character identification information; and
provide, using an item of service identification information, a service in accordance with a character of a device to a user who uses the device,
wherein the service identified by the one item of service identification includes a first natural interaction service corresponding to the character of the device.

* * * * *